(12) United States Patent
Banaszuk et al.

(10) Patent No.: US 9,109,896 B2
(45) Date of Patent: Aug. 18, 2015

(54) MODEL-BASED EGRESS SUPPORT SYSTEM

(75) Inventors: Andrzej Banaszuk, Simsbury, CT (US); Sergey Shishkin, Marlborough, CT (US); Satish Narayanan, Ellington, CT (US); Robert N. Tomastik, Rocky Hill, CT (US); Robert E. LaBarre, Ashford, CT (US); Nathan S. Hariharan, Vernon, CT (US); Philippe Detriche, Boissy L'aillerie (FR)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 1197 days.

(21) Appl. No.: 12/733,756

(22) PCT Filed: Sep. 20, 2007

(86) PCT No.: PCT/US2007/020393
§ 371 (c)(1),
(2), (4) Date: Sep. 16, 2010

(87) PCT Pub. No.: WO2009/038563
PCT Pub. Date: Mar. 26, 2009

(65) Prior Publication Data
US 2012/0276517 A1   Nov. 1, 2012

(51) Int. Cl.
*G08B 25/01* (2006.01)
*G01C 21/00* (2006.01)

(52) U.S. Cl.
CPC ..................... *G01C 21/00* (2013.01)

(58) Field of Classification Search
USPC ........................................................ 434/365
See application file for complete search history.

(56) References Cited

U.S. PATENT DOCUMENTS

| | | | | |
|---|---|---|---|---|
| 2,992,839 A | * | 7/1961 | Simonini | 285/290.1 |
| 4,754,266 A | * | 6/1988 | Shand et al. | 340/691.2 |
| 5,335,180 A | * | 8/1994 | Takahashi et al. | 701/117 |
| 5,790,019 A | | 8/1998 | Edwin | |
| 5,979,607 A | * | 11/1999 | Allen | 187/390 |
| 6,000,505 A | * | 12/1999 | Allen | 187/391 |
| 6,073,262 A | | 6/2000 | Larkin et al. | |
| 6,078,253 A | | 6/2000 | Fowler | |
| 6,314,204 B1 | | 11/2001 | Cham et al. | |
| 6,317,042 B1 | * | 11/2001 | Engelhorn et al. | 340/539.16 |
| 6,499,025 B1 | | 12/2002 | Horvitz et al. | |

(Continued)

FOREIGN PATENT DOCUMENTS

| | | |
|---|---|---|
| CN | 1567393 A | 1/2005 |
| EP | 1433735 | * 12/2003 |
| EP | 1717554 A2 | 2/2006 |

OTHER PUBLICATIONS

Tomastik, "Agent-Based Simulation Model of People Movement in Buildings, Egress Project," Jun. 2006, pp. 1-12.

(Continued)

*Primary Examiner* — Robert J Utama
(74) *Attorney, Agent, or Firm* — Cantor Colburn LLP

(57) ABSTRACT

A model-based egress support system (10) employs models to generate an optimal egress route for occupants in a region. The system includes an egress controller (16) that is connected to receive detection data. The egress controller (16) executes an optimization algorithm (22) to select an egress route based on model-based egress estimates generated by an egress prediction model (18) in response to the detection data.

14 Claims, 9 Drawing Sheets

(56) References Cited

U.S. PATENT DOCUMENTS

| | | | |
|---|---|---|---|
| 6,529,128 B2* | 3/2003 | Weng | 340/539.1 |
| 6,615,175 B1 | 9/2003 | Gazdzinski | |
| 6,778,071 B2* | 8/2004 | Megerle | 340/332 |
| 7,026,947 B2* | 4/2006 | Faltesek et al. | 340/691.1 |
| 7,035,650 B1* | 4/2006 | Moskowitz et al. | 455/456.5 |
| 7,035,764 B2 | 4/2006 | Rui et al. | |
| 7,068,599 B1 | 6/2006 | Jiang et al. | |
| 7,109,685 B2 | 9/2006 | Tate, Jr. et al. | |
| 7,139,409 B2 | 11/2006 | Paragios et al. | |
| 7,199,724 B2* | 4/2007 | Danvir et al. | 340/691.1 |
| 7,308,118 B1* | 12/2007 | Meadows | 382/113 |
| 2002/0149491 A1* | 10/2002 | Crandall et al. | 340/691.1 |
| 2003/0069002 A1 | 4/2003 | Hunter et al. | |
| 2003/0215141 A1 | 11/2003 | Zakrzewski et al. | |
| 2003/0234725 A1* | 12/2003 | Lemelson et al. | 340/521 |
| 2004/0036579 A1* | 2/2004 | Megerle | 340/332 |
| 2004/0153334 A1* | 8/2004 | Dione | 705/1 |
| 2004/0249597 A1 | 12/2004 | Whitehead | |
| 2005/0078852 A1 | 4/2005 | Buehler | |
| 2005/0128070 A1* | 6/2005 | Faltesek et al. | 340/524 |
| 2005/0190053 A1 | 9/2005 | Dione | |
| 2005/0201591 A1 | 9/2005 | Kiselewich | |
| 2006/0062429 A1 | 3/2006 | Ramaswamy et al. | |
| 2006/0088013 A1 | 4/2006 | Ganesh | |
| 2006/0227862 A1 | 10/2006 | Campbell et al. | |
| 2007/0003141 A1 | 1/2007 | Rittscher et al. | |
| 2007/0027612 A1* | 2/2007 | Barfoot et al. | 701/117 |
| 2007/0031005 A1 | 2/2007 | Paragios et al. | |
| 2007/0096896 A1 | 5/2007 | Zingelewicz et al. | |
| 2007/0279210 A1* | 12/2007 | Li et al. | 340/506 |
| 2008/0157984 A1* | 7/2008 | Li et al. | 340/584 |
| 2009/0018875 A1* | 1/2009 | Monatesti et al. | 705/7 |
| 2009/0138353 A1* | 5/2009 | Mendelson | 705/14 |
| 2010/0057354 A1* | 3/2010 | Chen et al. | 701/209 |
| 2012/0276517 A1* | 11/2012 | Banaszuk et al. | 434/365 |

OTHER PUBLICATIONS

Search Report and Written Opinion of International Application No. PCT/US07/20291 filed Sep. 19, 2007.

Search Report and Written Opinion of International Application No. PCT/US07/20315 filed Sep. 19, 2007.

Search Report and Written Opinion of International Application No. PCT/US07/20279 filed Sep. 19, 2007.

Search Report and Written Opinion of International Application No. PCT/US07/20393 filed Sep. 20, 2007.

Search Report and Written Opinion of International Application No. PCT/US08/12580 filed Nov. 7, 2008.

Search Report and Written Opinion of International Application No. PCT/US08/02528 filed Feb. 26, 2008.

Search Report and Written Opinion of International Application No. PCT/US08/02520 filed Feb. 26, 2008.

Yang, Danny B., et al. "Counting People in Crowds with a Real-Time Network of Simple Image Sensors.".

Bobruk, Joshua, et al. "Laser Motion Detection and Hypothesis Tracking from a Mobile Platform.".

Meyn, Sean, et al. "Estimator based on sensor networks and pathy utility (and stimulator).".

"Geometric distribution." Wikipedia. Retrieved Oct. 2, 2008 from <http://en.wikipedia.org/wiki/Geometric_distribution> 4 pages.

"Constraint satisfaction." Wikipedia. Retrieved Oct. 7, 2008 from <http://en.wikipedia.org/wiki/Constraint_satisfaction> 3 pages.

"Poisson distribution." Wikipedia. Retrieved Oct. 2, 2008 from <http://en.wikipedia.org/wiki/Poisson_distribution> 7 pages.

"Optimization problem." Wikipedia. Retrieved Oct. 7, 2008 from <http://en.wikipedia.org/wiki/Optimization_problem> 2 pages.

Yoo, Yerin. "Tutorial on Fourier Theory." Mar. 2001. 18 pages.

Fleuret, Francois, et al. "Multi-Camera People Tracking with a Probabilistic Occupancy Map." Mar. 27, 2007.

"Tracking of Interacting People and Their Body Parts for Outdoor Surveillance." Jun. 17, 2005.

Biever, Celeste. "Buildings could save energy by spying on inhabitants." NewScientist. Apr. 2007. Retrieved Mar. 18, 2010 from <http://www.newscientist.com/article/dn11734> 2 pages.

Chinese Office Action dated Apr. 27, 2012; Chinese Application No. 200780101598.1, (29 pages).

* cited by examiner

MODEL-BASED EGRESS SUPPORT SYSTEM

BACKGROUND

The present invention is related to an egress support system, and in particular to a model-based egress controller for supporting egress operations.

First responders and other emergency personnel are required to make decisions regarding the allocation of resources when responding to an emergency situation, including how to coordinate resources to save occupants within the building, minimize risk to the first responders, and protect property. In addition, these decisions must typically be made on a time scale consistent with the evolution of the threat, which can require decision-making within seconds or minutes. First responders often have limited information regarding the location of a threat and/or the location of occupants within a building or region. Without further information, first responders may not be able to allocate resources in the most effective manner.

In addition, occupants within a building are typically provided with static instructions regarding egress procedures for exiting a building. For example, egress instructions may be limited to signs within a building illustrating the location of exits and/or exit signs illustrating the presence of an exit. Thus, the egress instructions provided to occupants are based solely on the nearest exit, and do not incorporate dynamic data such as the location of a detected threat.

SUMMARY

In one aspect, the present disclosure describes an egress support system that includes an input operably connected to receive detection data. An egress controller includes an optimization algorithm and an egress prediction model. The egress controller executes the optimization algorithm to select an optimal egress route based on the model-based estimates generated by the prediction model in response to the detection data.

In another aspect, the present disclosure describes a method of providing egress support to a region. The method includes acquiring detection data from one or more detection devices. The method further includes generating model-based estimates based on a prediction model and the detection data. The method further includes selecting an optimal egress route for occupants within the region based on the model-based estimates. The method further includes controlling one or more egress instructional devices based on the selected egress route to instruct the movement of occupants within the region.

In another aspect, the present disclosure describes an egress controller that includes means for receiving occupant location data from one or more occupant detection devices and means for receiving threat location data from one or more threat detection devices. Based on these inputs and an egress model, the egress controller includes means for generating model-based egress estimates based on an egress prediction model, the occupant location data, and an egress route. The egress control also includes means for selecting an optimal egress route for occupants within the region based on the model-based egress estimates generated with respect to a plurality of egress routes, the occupant location data, and the threat location data. The egress controller further includes means for controlling instructions devices based on the selected egress route to instruct the movement of occupants within the region.

In another aspect, the present disclosure describes a computer readable storage medium encoded with a machine-readable computer program code for selecting an optimal egress route for a region. The computer readable storage medium includes instructions for causing a controller to implement a method that includes acquiring detection data from one or more detection devices. The method further includes generating model-based estimates based on a prediction model and selecting an optimal egress route for occupants within the region based on the model-based estimates.

DETAILED DESCRIPTION

Figure 1:
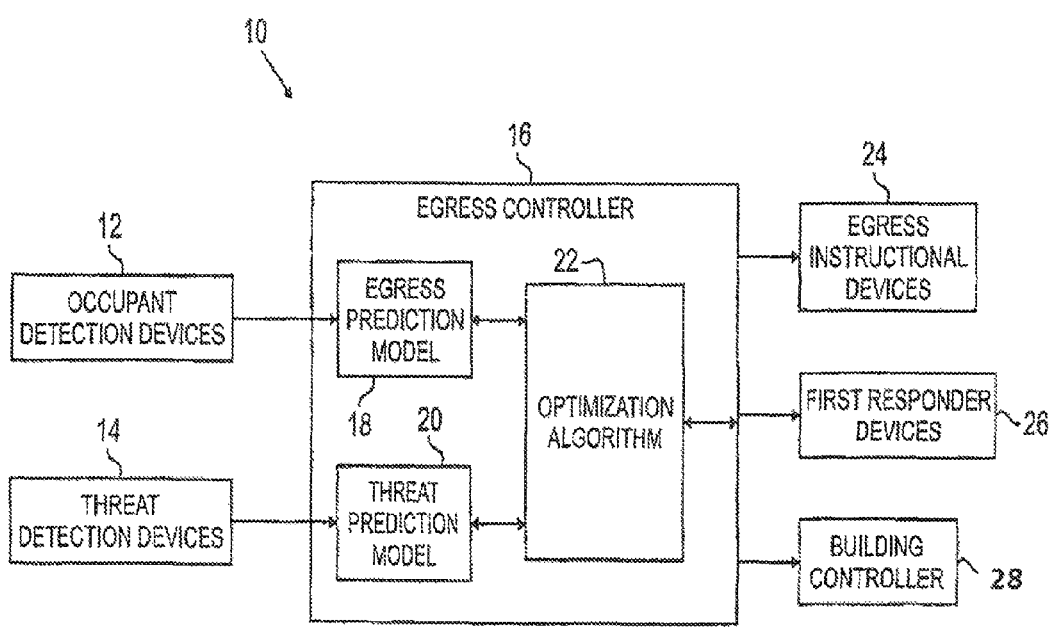
FIG. 1 is a block diagram of a model-based egress controller.

The present disclosure describes a model-based egress controller that optimizes egress operations for a building or region. In an exemplary embodiment, an egress controller receives input from one or more sensors describing the location of occupants within the region, location of a detected threat within the region, and/or type of threat detected. The egress controller generates an optimized egress route based on a predictive model and an egress optimization algorithm.

In an exemplary embodiment, the predictive model is a egress prediction model that generates model-based egress estimates regarding the likely propagation of occupants towards selected exits during egress. In particular, the egress prediction model can be used to generate model-based estimates of the time required for all occupants to evacuate. The egress optimization algorithm uses the egress prediction model to model, in real-time, various egress scenarios in which occupants are directed toward a variety of exits. In this way, the egress optimization algorithm is able to determine, based on the modeled scenarios, the egress route that will minimize the time required to evacuate all occupants (i.e. an optimal egress route).

In another exemplary embodiment, the prediction model is a threat prediction model that generates model-based threat prediction estimates regarding the likely propagation of a threat. The egress optimization algorithm uses the threat prediction model to model, in real-time, those egress routes that will be available to occupants based on the model-based threat prediction estimates. In this way, the egress optimization algorithm is able to determine the egress route that will minimize occupant exposure to a detected threat (i.e., an optimal egress route).

Based on the optimized egress route determined by the egress optimization algorithm, the egress controller communicates instructions to occupants within the building or region to direct them along the optimized egress route. In addition, the optimized egress route, along with occupant data and threat detection data, may be provided to first responders to direct their efforts in locating the source of the threat and to aid in the search and rescue of occupants. Finally, the egress controller may provide input to building control operations such as the heating, venting and air-conditioning (HVAC) system and elevator control system to minimize the spread of a detected threat and to aid in the evacuation of occupants.

In addition, the term 'egress route' is used throughout to describe paths available to occupants during egress. The term 'optimal egress route' refers to the selection of one or more of the possible egress routes based on some criteria. However, it should be noted that the term 'egress route' and 'optimal egress route', although expressed in singular form, may refer to a plurality of individual egress routes. That is, an optimal egress route may include a plurality of individual egress routes designed for occupants located throughout a region.

FIG. 1 is a block diagram of an exemplary embodiment of egress support system 10, which includes occupant detection device(s) 12, threat detection device(s) 14, egress controller 16, egress prediction model 18, threat prediction model 20, egress optimization algorithm 22, egress instructional devices 24, first response devices 26, and building controller 28. Egress controller 16 is connected to receive occupant location data from one or more occupant detection devices 12 and threat detection data from one or more threat detection devices 14.

Occupant detection device 12 refers to sensors capable of detecting the location of occupants throughout a region. This may include a binary representation indicating the detected presence of occupants within a particular room or zone of the region (e.g., the room is occupied or the room is un-occupied), or may include additional information concerning the number of occupants detected in a particular room or zone. A variety of devices may be utilized to detect occupants within the region, including motion detection sensors, video detectors, passive infrared sensors, access control devices, elevator load measurements, IT-related techniques (e.g., keystroke detection), as well as other related sensor devices. In addition, many occupants carry active devices, such as active or passive radio frequency identification (RFID) cards, cell phones, or other devices that can be detected to provide data indicative of the occupant's location. Occupant detection device 12 provides occupant location data to egress prediction model 18, which uses the occupant location data as a starting point in generating model-based estimates of the time required to evacuate all occupants.

Threat detection device 14 refers to devices capable of detecting the presence of threats, such as smoke, toxins, gas, or other dangerous or harmful conditions. Once again, the data provided by threat detection device 14 may include a binary representation indicating the detected presence of a harmful condition in a particular location (e.g., harmful condition detected in a room or harmful condition is not detected in a room). In other embodiments, the data provided by threat detection device 14 may include more detailed information regarding the type of harmful condition sensed or concentration of detected condition (i.e., concentration of smoke) at a particular location. Threat detection device 14 may include typical threat detection devices such as smoke alarms or carbon monoxide alarms, or may include non-traditional devices for threat detection such as video devices. Threat detection devices provide threat location data to threat prediction model 20, which uses the threat location data as a starting in generating model-based estimates of the predicted propagation of the detected threat.

In an exemplary embodiment, some detection devices, such as video detection devices, may be used to provide occupant location data as well as threat detection data.

Egress prediction model 18 is a mathematical, computer simulation, or statistical model used to predict expected traffic patterns of occupants during an egress condition (i.e., evacuation of the region). Egress prediction models are described in more detail in co-pending PCT application Ser. No. PCT/US07/20291 filed on Sep. 19, 2007 and entitled "System and Method for Occupancy Estimations" by Robert Tomastik, the disclosure of which is incorporated by reference herein, with relevant portions reproduced in Appendix A. In particular, given an initial condition that defines the current location of occupants within the region, and the exits those occupants will be instructed to use, egress prediction model generates model-based estimates of how occupants will move, including an estimate of the time required for all occupants to exit the region.

Threat prediction model 20 is a mathematical, computer simulation, or statistical model used to predict the expected propagation of threats through a region. Threat prediction models are described in more detail in co-pending PCT application Ser. No. PCT/US07/20315 filed on Sep. 19, 2007 and entitled "System and Method for Threat Propagation Estimation" by Nathan Hariharan, the disclosure of which is incorporated by reference herein, with relevant portions reproduced in Appendix B. In particular, given an initial condition that defines the current location of the detected threat, threat prediction model 20 generates model-based estimates of the expected propagation of the threat through the region. Therefore, threat prediction model 20 can be used to model the likely path of the threat, including the time it will take a threat to reach various location within the region.

Optimization algorithm 22 employs the predictive capabilities of egress prediction model 18 and threat prediction model 20 to calculate an optimal egress route for occupants within the region. In an exemplary embodiment, the optimal egress route preferably minimizes the time required to evacuate all occupants from the building while also preferably minimizing occupant exposure to the detected threat. The optimal egress route can be used in a variety of ways to aid in the evacuation of a region. For instance, based on a calculated optimized egress route, egress controller 16 may generate egress control instructions that are communicated to occupants within the region via egress instructional devices 24, which guide occupants along the optimal egress route. Egress controller 16 may also provide data (such as the calculated optimal egress route, occupant location data and threat detection data) to first responder devices 26, providing first responders with valuable information regarding the location of a threat, location of occupants, and instructed exit routes communicated to occupants. In addition, egress controller 16 may communicate with building controller 28 to control operations that range from elevator control to heating, venting, and air-conditioning (HVAC) operations of the region.

In an exemplary embodiment, optimization algorithm 22 seeks to calculate an egress route that preferably minimizes the time required to evacuate all occupants from a region, subject to the constraint that the egress route selected should minimize occupant exposure to the detected threat. In an exemplary embodiment, optimization algorithm 22 may be formulated in the form of a mixed integer programming problem. In an exemplary embodiment, a linear mixed integer programming algorithm is used to find an egress route that minimizes the total time required to evacuate all occupants. In addition, the linear mixed integer programming algorithm operates within one or more constraints, such as a constraint requiring that occupant exposure to a detected threat should by minimized.

In an exemplary embodiment, a constraint related to occupant exposure to a detected threat prevents the selection of an egress route that will expose occupants to the threat. In other embodiments, the exposure to a detected threat may depend on the type of threat detected. For instance; egress routes directing occupants through smoke-filled hallways may be acceptable in some instances, whereas egress routes directing occupants through areas breached by flames may be prohibited.

Thus, optimization algorithm 22 communicates with egress prediction model 18 and/or threat prediction model 20 to calculate an optimal egress route. In an exemplary embodiment, optimization algorithm 22 instructs egress prediction model 18 to generate model-based estimates, based on a variety of possible egress scenarios. For instance, optimization algorithm 22 may instruct egress prediction model 18 to model the effects of instructing all occupants to move toward a single exit, and another model in which some occupants are instructed to exit through a first exit, and some are instructed to exit through a second exit. Occupant detection data provided by occupant detection device 12 is used to initialize egress prediction model 18, and optimization algorithm 22 instructs egress prediction model 18 to model egress scenarios in which occupants egress through a variety of available exits. The scenario that results in all occupants being evacuated in the shortest amount of time, within the given constraint that occupant exposure to a detected threat should be minimized, is selected by optimization algorithm 22. An optimal egress route selected by optimization algorithm 22 may be dynamically modified based on updated information regarding the correct location of occupants or the location of a detected threat. Thus, the optimal egress route may be dynamically modified as conditions change.

In an exemplary embodiment, optimization algorithm 22 communicates with threat prediction model 20 (or in combination with threat prediction model 20 and egress prediction model 18) to obtain information regarding the anticipated or predicted propagation of the threat through a region. In an exemplary embodiment, optimization algorithm 22 uses model-based threat propagation estimates provided by threat prediction model 20 to determine which exits or areas may be used by occupants, and which areas have been exposed to a particular threat such that instructing occupants to enter the exposed area will violate one of the constraints of optimization algorithm 22.

In an exemplary embodiment, optimization algorithm 22 generates an optimal egress route based only on model-based estimates generated by threat prediction model 20. In another exemplary embodiment, optimization algorithm 22 generates an optimal egress route based on a combination of models generated by egress prediction model 18 and threat prediction model 20. Because threat prediction model 20 is predictive, optimization algorithm 22 can use model-based threat propagation estimates that define the likely propagation of the threat at some future time interval to make decisions regarding which exits and passages are available to occupants. For example, if threat prediction model 20 generates an estimate that indicates a detected threat will reach a stairwell in five minutes, optimization algorithm 20 may generate an optimized egress route that instructs those occupants that a model-based egress estimate (generated by egress prediction model 18) suggests can reach and pass through the stairwell within five minutes to use that route. However, occupants that, according to model-based egress estimates, would require more than five minutes to reach or use the stairwell would be instructed to use an alternate route designed by optimization algorithm 22 to prevent exposing those occupants to the likely path of the detected threat.

In other embodiments, optimization algorithm 22 may generate optimized egress routes without predictive knowledge of the expected propagation of the threat (i.e., without input from threat prediction model 20). Rather, optimization algorithm 22 would rely only on the present location of a threat as detected by threat detection device 14 (if available) and predictive estimates of occupant egress generated by egress prediction model 18. Likewise, in other embodiments optimization algorithm may generate optimized egress routes without predictive knowledge of the expected egress of occupants (i.e., without input from egress prediction model 18). Rather, optimization algorithm 22 would rely only on the present location of occupants as detected by occupant detection device 12 and predictive estimates of threat propagation generated by threat prediction model 20.

In an exemplary embodiment, the optimized egress route determined by optimization algorithm 22 is used by egress controller 16 to generate egress control instructions. The egress control instructions are communicated to egress instructional devices that are used to communicate the optimized egress route to occupants located within the building or region. These may include visual or auditory devices for communicating instructions to occupants throughout the building. Depending on the location of the occupants, the instructions provided by the visual or auditory devices may vary. Examples of visual devices controlled by egress controller 16 to communicate an optimal egress route to occupants include signs or lights that can be selectively controlled to indicate the direction occupants should travel. Visual and auditory instructions may be used alone or in conjunction with one another to communicate to occupants the optimal egress route as determined by egress controller 16.

In an exemplary embodiment, egress controller 16 may also provide data to first-responders regarding the optimal egress route as determined by optimization algorithm 22. First responder devices 26 may be portable devices carried by first responders that are equipped to communicate with egress controller 16. Communication between first responder device 26 and egress controller 16 may be via a telecommunications network, wireless network, or similar communications network. In one exemplary embodiment, the data provided by egress controller 16 may include a visual layout of the building that illustrates visually the location of occupants and detected threats, as well as the optimized egress route generated by egress controller 16. This information aids in the distribution of resources by first responders into the building. For instance, the type of threat detected allows first responders to respond with the proper equipment. Knowledge regarding the location of the threat allows the first responders to target resources more specifically to contain the threat, as well as to avoid placing themselves in danger, and knowledge regarding the location of occupants and instructed egress route allows first responders to target rescue efforts more specifically to maximize the number of people saved.

In an exemplary embodiment, the optimal egress route as determined by optimization algorithm 22 is provided to first responders for review. This allows first responders the opportunity to influence and modify the egress route based on their experience and expertise.

Egress controller 16 may also provide data to building controller 28, which may include systems such as the heating, venting, and air-conditioning (HVAC) control systems and elevator control systems. For instance, in emergency egress situations, elevators may be automatically disabled as a precautionary measure. Oftentimes, however, elevators in a building are capable of operating for some time after detection of a threat. In an exemplary embodiment, egress controller 16 may instruct the elevator control system to continue to operate the elevators until such time that egress controller 16 detects the threat propagating into the elevator shafts. For example, in an exemplary embodiment, threat detection device 14 may be located in the elevator shafts to detect smoke and/or other agents in the elevator shafts. In another exemplary embodiment, threat propagation estimates generated by threat prediction model 20 may be used to predict when a threat will reach a particular elevator shaft. Based on this estimate, optimization algorithm 22 can design an optimized egress route that makes use of the elevator shaft for a period of time before the threat puts the elevator shaft at risk. In this example, egress controller 16 would provide instructions to building controller 28 (or an elevator controller) to cause the elevators to continue to operate while safe. In this way, the elevator may be used as an additional exit for occupants that decreases the overall time required to evacuate occupants from the building.

In addition, based on the sensed location of occupants within the building and the location of a detected threat within the building, egress controller 10 may control the HVAC system to minimize the propagation of the threat towards occupants. For instance, if a chemical agent is detected in one region of the building, egress controller 10, based on the detected location of the chemical agent, may instruct the HVAC control system through building controller 28 to discontinue circulating air from the region in which the chemical agent was detected. This may also be used to prevent or retard the progress of smoke throughout a building. In an exemplary embodiment, control instructions provided to control the operation of the HVAC system or other systems used to control the propagation of a threat are also provided to threat prediction model 20. In this way, threat prediction model 20 is updated to model the propagation of a threat through the building based on control instructions provided to the HVAC system or similar systems.

Figure 2:
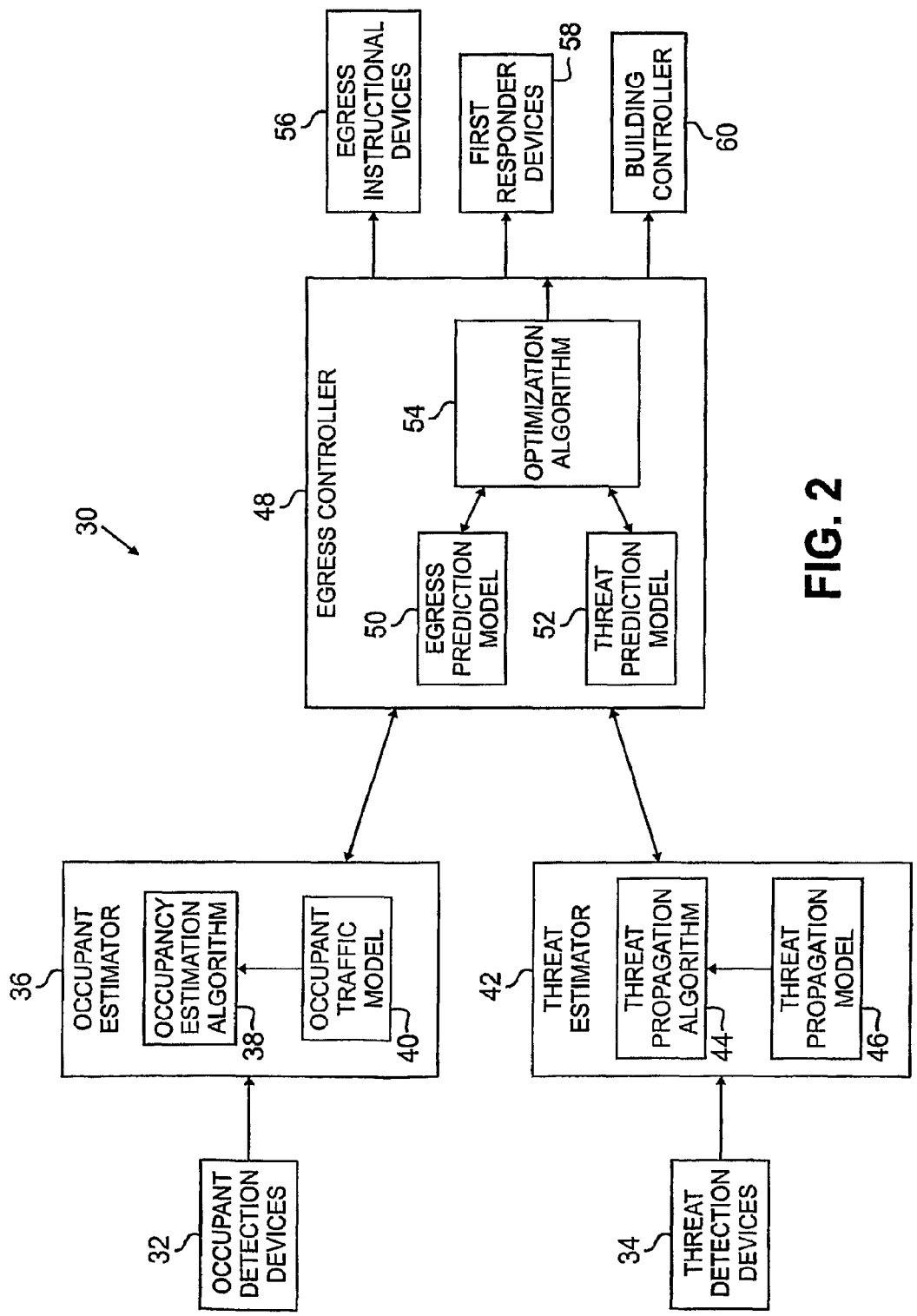
FIG. 2 is a block diagram of another embodiment of the model-based egress controller.

FIG. 2 illustrates another exemplary embodiment of egress support system 30, which includes occupant detection device(s) 32, threat detection device(s) 34, occupant estimator 36, occupancy estimation algorithm 38, occupant traffic model 40, threat estimator 42, threat propagation algorithm 44, threat propagation model 46, egress controller 48, egress prediction model 50, threat prediction model 52, optimization algorithm 54, egress instructional devices 56, first responder devices 58, and building controller 60.

In the exemplary embodiment shown in FIG. 2, egress controller 48 is connected to receive occupant data (e.g., the location of occupants within a region) from occupant estimator 36, which generates occupancy estimates based on a combination of sensor data provided by occupant detection device 32 and a model-based occupancy estimate generated by occupant traffic model 40. Occupant estimators are described in more detail in co-pending PCT application Ser. No. PCT/US07/20291 filed on Sep. 19, 2007 and entitled "System and Method for Occupancy Estimation" by Robert Tomastik, the disclosure of which is incorporated by reference herein, with relevant portions reproduced in Appendix A. A benefit of occupant estimator 36 is the ability to provide occupancy estimates despite the loss of sensor data.

In addition, egress controller 48 is connected to receive threat propagation estimates from threat estimator 42, which generates threat propagation estimates based on a combination of sensor data provided by threat detection device 34 and a model-based threat propagation estimate generated by threat propagation model 46. Threat estimators are described in more detail in co-pending PCT application Ser. No. PCT/US07/20315 filed on Sep. 19, 2007 and entitled "System and Method for Threat Propagation Estimation" by Nathan Hariharan, the disclosure of which is incorporated by reference herein, with relevant portions reproduced in Appendix B. Once again, a benefit of threat estimator 42 is the ability to provide threat propagation estimates despite the loss of sensor data.

As described with respect to FIG. 1, egress controller 48 may employ model-based egress estimates (generated by egress prediction model 50) and/or model-based threat prediction estimates generates (generated by threat prediction model 52) in generating an optimal egress route.

In an exemplary embodiment, occupant estimates generated by occupant estimator 36 are used to initialize egress prediction model 50. That is, egress prediction model 50 models a variety of egress scenarios based on the occupant estimates provided by occupant estimator 36. As described with respect to FIG. 1, optimization algorithm 54 instructs egress prediction model 50 to generate, in a real-time, a number of egress scenarios in which occupants are modeled evacuating through different exits. Based on the results, a scenario (i.e., optimal egress route) is selected by optimization algorithm 54 that preferably minimizes the amount of time required to evacuate all occupants (while preferably minimizing occupant exposure to the detected threat). In an exemplary embodiment, occupant estimator 36 generates updated occupancy estimates at a defined time-step (e.g., once per second, once every 30 seconds, etc.). In response, each time an updated occupancy estimate is provided to egress controller 48, optimization algorithm 54 re-runs egress scenarios with egress prediction model 50 based on the updated occupancy estimate. In this way, an optimized egress route may be dynamically modified based on updated occupancy data.

In addition, in an exemplary embodiment egress controller 48 provides the optimized egress route as feedback to occupant estimator 36. Because occupant traffic model 40 generates model-based occupancy estimates based on the expected traffic patterns of occupants in the region, providing occupant traffic model 40 with information regarding the optimized egress route (i.e., the egress route communicated to occupants) improves the ability of occupant traffic model 40 to predict the traffic patterns of occupants. That is, occupant traffic model 40 is modified based on the egress instructions provided to occupants via egress instructional devices 56. In this way, the model-based occupant estimates generated by occupant traffic model 40 are improved.

In an exemplary embodiment, egress controller 56 communicates with threat estimator 42 (either alone or in combination with communications with occupant estimator 36). In much the same way that occupant estimates generated by occupant estimator 36 are used to initialize egress prediction model 50, threat estimator generates threat propagation estimates that are used to initialize threat prediction model 52. Based on the threat propagation estimate, which at the very least provides data regarding the current location of a detected threat, threat prediction model 52 generates model-based threat prediction estimates, in real-time, that estimate when a detected threat will propagate throughout a region. As discussed above with respect to FIG. 1, based on threat prediction estimates optimization algorithm 54 is able to comply with constraints that prevent egress routes from putting occupants in danger.

In an exemplary embodiment, egress controller 48 provides to threat estimator 42 instructions provided to building controller 60 to modify the propagation of a detected threat. For instance, egress controller 48 may provide instructions to building controller 60 to affect the operation of building systems such HVAC systems to delay or otherwise affect the propagation of a detected threat (e.g., fans located in an area with a detected threat may be shut off to prevent the fans from propagating the threat to other areas). Providing threat estimator 42 with this information allows for threat propagation model 46 to be dynamically modified to account for changes in how the threat will propagate. As discussed with respect to FIG. 1, this information may also be used to dynamically modify threat prediction model 52 to account the changes in how the threat will propagate.

Output provided to occupant-based egress instructional devices 56, first responder devices 58, and building controller 60 includes an optimized egress route as determined by egress optimization algorithm 54. In addition, the output provided by egress controller 30 may also include data regarding real-time and near future estimates of occupancy throughout a building or region, predicted propagation of a detected threat, and the likely origin of the detected threat. This information may be particularly useful to first responders to aid in the allocation of resources and personnel. In particular, the likely origin of a detected threat may aid first responders in the containment of the threat. Likewise, information regarding the predicted propagation of a detected threat as well as near future estimates of occupancy throughout a building or region may aid in the allocation of resources to those occupants located in the predicted path of the threat.

In addition, data regarding real-time and near future estimates of occupancy throughout a building or region, predicted propagation of a detected threat, and the likely origin of the detected threat the data may also be provided to building controller 56 to control operations such as eliminator operation and HVAC operation. In particular, near future estimates of threat propagation may be useful in determining the length of time elevators within a building may be safely operated despite the detection of a threat. In addition, the likely origin of a detected threat may be useful in controlling HVAC operations to prevent the threat from propagating throughout the building or region.

Figure 3:
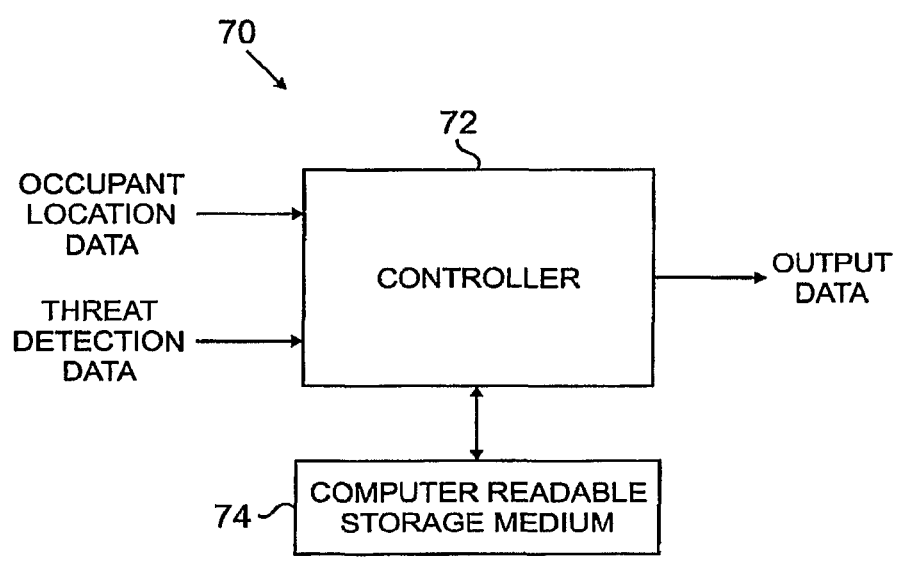
FIG. 3 is a block diagram of a computer system for implementing the model-based egress controller.

FIG. 3 illustrates system 70 for generating an optimized egress route base on occupant location data and threat detection data. System 70 includes controller 72 and computer readable medium 74. In the embodiment shown in FIG. 3, controller 72 executes the steps or processes for calculating an optimized egress route. Thus, the disclosed invention can be embodied in the form of computer or controller implemented processes and apparatuses for practicing those processes. The present invention can also be embodied in the form of computer program code containing instructions embodied in computer readable medium 74, such as floppy diskettes, CD-ROMs, hard drives, or any other computer-readable storage medium, wherein, when the computer program code is loaded into and executed by controller 72, the computer becomes an apparatus for practicing the invention. The present invention may also be embodied in the form of computer program code as a data signal, for example, whether stored in a storage medium 74, loaded into and/or executed by controller 72, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

For example, in an embodiment shown in FIG. 3, computer readable storage medium 74 may store program code or instructions describing the egress prediction model, the threat prediction model, and the optimization algorithm. The computer program code is communicated to controller 72, which executes the program code to implement the processes and functions described with respect to the present invention.

Although the present invention has been described with reference to preferred embodiments, workers skilled in the art will recognize that changes may be made in form and detail without departing from the spirit and scope of the invention. For example, the present invention has been described with respect to egress operations generated in response to a threat or evacuation mode. In other embodiments the present invention may be used in conjunction with other egress operations. For example, following a concert or sporting event, the present invention may be used to generate optimal egress routes. For example, although a computer system including a processor and memory was described for implementing the egress controller, any number of suitable combinations of hardware and software may be employed for executing the optimization algorithm employed by the egress controller and for storing data and models employed by the optimization algorithm. In addition, the computer system may or may not be used to provide data processing of received sensor data. In some embodiments, the sensor data may be pre-processed before being provided as an input to the computer system responsible for executing the egress controller functions. In other embodiments, the computer system may include suitable data processing techniques to process that provided sensor data (e.g., video recognition software for interpreting and analyzing video data provided by a video detection device).

Furthermore, through the specification and claims, the use of the term 'a' should not be interpreted to mean "only one", but rather should be interpreted broadly as meaning "one or more". The use of sequentially numbered steps used throughout the disclosure does not imply an order in which the steps must be performed. The use of the term "or" should be interpreted as being inclusive unless otherwise stated.

APPENDIX A

Disclosed herein is a system and method for estimating occupancy based on data provided by sensor devices and an occupant traffic model. Sensor data may be provided by a variety of different types of sensor devices, each providing a different type of sensor output that is analyzed to detect occupant movements or locations throughout an area or region. The occupant traffic model is based on historical or expected traffic patterns of occupants throughout the area or region and may take into account factors such as layout of the region or building. For example, building layout may include information describing the location of exits, hallways, offices, and occupancy limits of associated hallways and offices. In addition, the occupant traffic model may be a mathematical model, a statistical model, or a computer simulation describing the predicted movement or traffic patterns of occupants within a region. An occupancy estimator takes as input both the sensor data and occupant traffic models, and executes an algorithm to generate an occupancy estimate for the area or region based on the provided inputs. The occupancy estimate based on both the sensor data and the occupant traffic models provides an occupancy estimation that is more accurate than the result of estimations based solely on sensor data or based solely on a model. In addition to the benefit of providing a more accurate estimation of occupancy and movement and changes thereto, the combination of sensor data with an occupant traffic model allows for the continued estimation of building occupancy despite the loss of data from one or more sensors, or pause in transmission of sensor data. This may be particularly beneficial in emergency situations in which sensors may be disabled or destroyed.

Figure 4A:
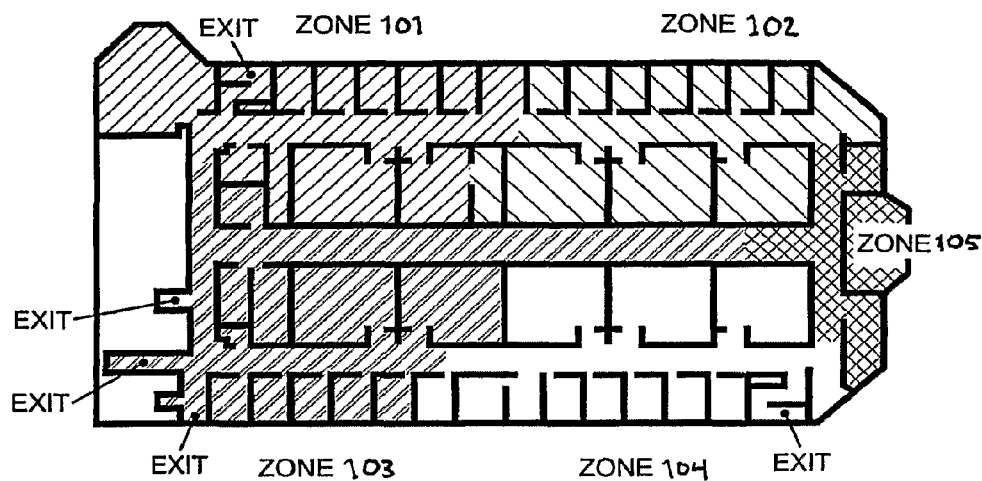
FIG. 4A is a schematic of a floor of a building divided into a number of zones.
Figure 4B:
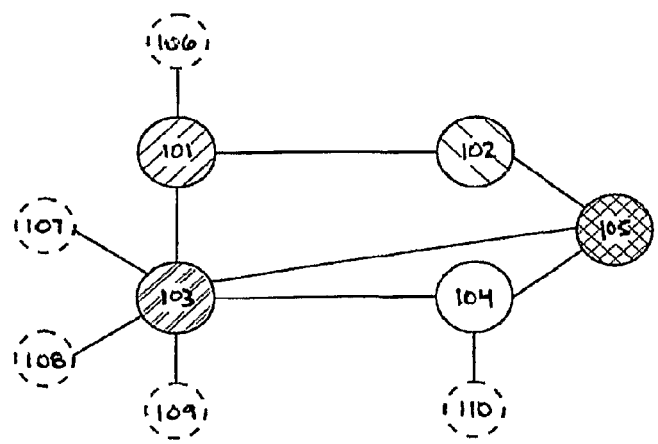
FIG. 4B is a diagram modeling the connection between zones of the building floor.

FIGS. 4A and 4B illustrate an example that will be used throughout this description to aid in describing the occupancy estimation algorithm, in which occupancy estimations are made for a particular floor of a building. The concepts described with respect to this embodiment could be applied in a variety of settings or locations (e.g., outdoors, train stations, airports, etc.). FIG. 4A illustrates the layout of a single floor in an office building. In this embodiment, the floor plan has been divided into five separate zones (labeled zones 101, 102, 103, 104 and 105). In other embodiments, the floor plan could be further sub-divided based on the location of individual offices and rooms (i.e., site-based sub-divisions). In this particular embodiment, the border between each adjacent zone 101-105 and at each exit includes a sensor (not shown) for detecting the movement of occupants from one zone to another. In other embodiments, additional sensors may be located in each zone to improve the resolution, reliability, and/or accuracy of occupancy estimates, or if a sensor at the border is not present or is not functioning.

FIG. 4B is a diagram illustrating the five zones defined in FIG. 4A. The large circles labeled 101, 102, 103, 104 and 105 represent the five zones, and the smaller circles labeled 106, 107, 108, 109 and 110 represent the exits from the building. The lines connecting zones indicate the presence of passages or hallways connecting adjacent zones.

The term 'region' is used throughout the description to refer to both a region as well as various sub-divisions of the region. For instance, in the exemplary embodiment shown in FIGS. 4A and 4B, the term 'region' refers to both the floor plan in general as well as to the individual sub-regions or zones 101-105. Therefore, generating an occupancy estimate for the region would include generating occupancy estimates for each of the individual zones.

In addition, the term 'occupancy estimate' is used throughout the description and refers generally to output related to occupancy. Therefore, an occupancy estimate for a region may include data such as a mean estimate of the number of occupants within the region, a probability associated with all possible occupancy levels associated with the region changes in occupancy, data indicative of the reliability of confidence associated with an estimate of occupancy, as well as other similarly useful data related to occupancy. Therefore, in the example shown in FIGS. 4A and 4B an occupancy estimate generated for a region would include any of the above-listed data generated for each of the zones 101-105.

Figure 5:
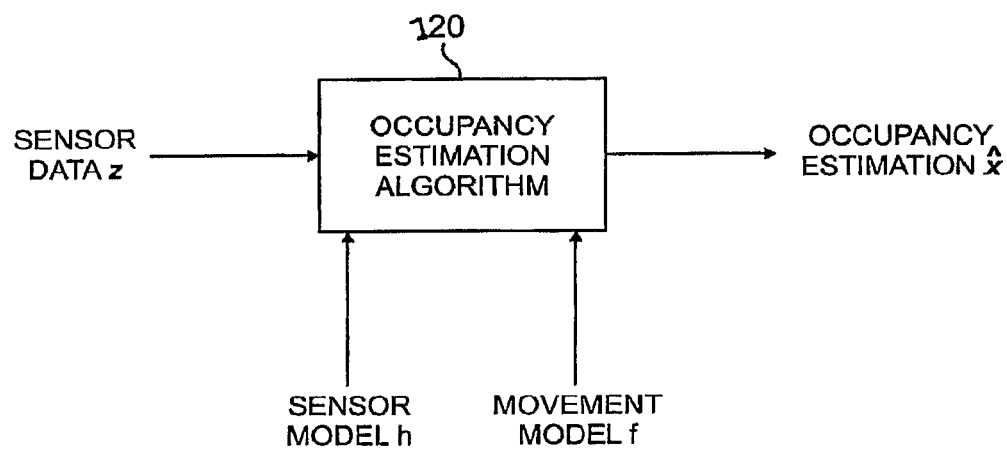
FIG. 5 is a flowchart illustrating the calculation of occupancy estimates based on sensor data, sensor models, and occupant traffic models.

FIG. 5 is a high-level block diagram illustrating an exemplary embodiment of the inputs provided to occupancy estimation algorithm 120. Inputs provided to occupancy estimation algorithm 120 include sensor data z (provided by one or more sensor devices), sensor model h, and occupant traffic model $f$. Occupancy estimation algorithm 120 derives an occupancy estimation $\hat{x}$ based on sensor data z, sensor model h, and occupant traffic model $f$. For instance, in the exemplary embodiment shown in FIGS. 4A and 4B, occupancy estimation algorithm 120 generates an occupancy estimate $\hat{x}$ for each of the five zones.

In an exemplary embodiment, sensor data z and occupancy estimate $\hat{x}$ are represented as vectors, although in other exemplary embodiments sensor data may be provided in other suitable formats. Occupant traffic model $f$ is a mathematical, computer simulation, or statistical model used to predict expected traffic patterns of occupants throughout a region, where such model may use a previous estimate of occupancy in the region. For example, occupant traffic model $f$ may be applied to a previous estimate of occupancy in each zone of the building to generate a predicted or model-based estimate of the occupancy in each zone of the building.

The model-based estimate of occupancy generated by applying the occupant traffic model $f$ is then combined with sensor data z (if available) by occupancy estimation algorithm 120. Occupancy estimation algorithm 120 combines the model-based estimate of occupancy provided by the occupant traffic model $f$ with the sensor data z by assigning weights to the respective inputs based on the predicted reliability of each. For example, if the sensor data z is determined to be highly reliable, then occupancy estimation algorithm 120 assigns a higher weight to the sensor data z and the corresponding occupancy estimation $\hat{x}$ is based in large part on the provided sensor data z. Vice versa, if the sensor data z is determined to be highly unreliable, then more weight is given to the model-based occupancy estimate provided by the occupant traffic model $f$.

Based on the model-based occupancy estimate, the sensor data z, and the weighting associated with both of these inputs, occupancy estimation algorithm 120 generates an occupancy estimate $\hat{x}$ for a region. For instance, with respect to the floor plan shown in FIGS. 4A and 4B, generation of an occupancy estimate $\hat{x}$ for the region may include generating an occupancy estimate for each of the five zones 101-105. In addition, the occupancy estimate $\hat{x}$ may include data such as the mean occupancy estimate associated with each of the five zones, the probability associated with each possible level of occupancy for each of the five zones, data related to movement of occupants within or between each of the five zones, as well as reliability associated with the above estimate for each of the five zones (e.g. a covariance value).

In addition, data generated as part of the occupancy estimate $\hat{x}$ may be interrelated to one another. For instance, the probability of occupancy in a region may be described graphically as a curve (e.g., a bell curve) that describes the likelihood associated with each possible occupancy level. The peak of the curve would represent the most likely estimate of the occupancy associated with the zone, but in addition, the shape of the curve (e.g., the standard deviation associated with the curve) would provide an indication of the confidence or reliability associated with the occupancy estimate. In other embodiments, the occupancy estimate x may include a confidence interval associated with the estimate, a covariance associated with the occupancy estimate, or other reliability calculations that indicate the confidence or reliability associated with an occupancy estimate $\hat{x}$.

In addition, in an exemplary embodiment the occupancy estimate $\hat{x}$ generated by occupancy estimation algorithm 120 is generated in real-time, allowing the occupancy estimate to be used in real-time applications (e.g., as input to first responders). In an exemplary embodiment, the occupancy estimate $\hat{x}$ may be used for forensic or after the fact estimates of occupancy within a building. In yet another exemplary embodiment, the occupancy estimate $\hat{x}$ can be used to predict occupancy estimates into the near future. Near future occupancy estimates may be useful in controlling applications such as elevator calls based on the expected near future movements of occupants within a building. Near future occupancy estimates may also be useful to first responders to provide data regarding not only the present location of occupants but the likely future location of building occupants.

In an exemplary embodiment, occupancy estimation algorithm 120 is an Extended Kalman Filter (EKF), which is a well known algorithm used to generate state estimates of a system based on observations and models. A benefit of the EKF is the ability to provide calculations based on received sensor data z and occupant traffic models $f$ in real-time. In an exemplary embodiment, the EKF employs an occupant traffic model $f$ to generate a predicted or model-based occupancy estimate based on a current or present occupancy estimate. In an exemplary embodiment, the model-based occupancy estimate is defined by the following equation:

$$x(t+1)=f(t,x(t))+v(t) \quad \text{Equation 1}$$

where x(t) represents occupancy in a region (e.g. in each zone in the example shown in FIGS. 4A and 4B) at time t, $f$ (e.g., the occupant traffic model) is some non-linear function of time t and states x(t), and v(t) is process noise, representing the uncertainty in how occupants move in a region. The structure of the non-linear function $f$ is dependent on the region. Thus, in the example related to occupancy estimates in a building, the exact form of function $f$ will vary depending on the layout of the building (among other factors). In addition, because the structure of $f$ describes the expected traffic patterns of occupants within the region, the form of function $f$ may also vary based on the 'mode' of the region. Mode defines the operating state of the region. For instance, during a fire or similar emergency, a building will be in an egress mode (i.e., evacuation mode) in which all occupants are modeled to move towards available exits. Other modes may be dictated by the time of day (e.g., building modes for morning activity versus building mode for afternoon activity) or other factors.

For the sake of simplicity, the following example assumes an egress mode, described with examples based on the floor plan illustrated in FIGS. 4A and 4B. Therefore, the following equation describes the occupant traffic model $f$ for a region (e.g., zone of the floor plan shown in FIGS. 4A and 4B):

$$x_1(t+1)=x_1(t)+y_{21}(t)+y_{31}(t)-y_{16}(t) \quad \text{Equation 2}$$

wherein $x_1(t+1)$ represents the state (e.g., number of occupants) in zone 101 at time t+1, $x_1(t)$ represents the previous state of occupants in zone 101 at time t, $y_{21}(t)$ represents the number of occupants moving from zone 102 to zone 101 at time t, $y_{31}(t)$ represents the number of occupants moving from zone 103 to zone 101 at time t, and $y_{16}(t)$ represents the number of occupants moving (exiting) from zone 101 via exit 106 at time t. The model would vary for non-egress modes in which occupants are not instructed to move towards exits. For example, movement of occupants would not be confined to movements from zone 102 to zone 101, but would also include movement from zone 101 to zone 102. The structure of occupant traffic model $f$ is therefore dependent, in part, on the layout of the building and may vary from region to region. In an exemplary embodiment based on the above example, the function relating the flow of occupants from zone 101 to exit 106 is modeled as:

$$y_{16}(t)=\min[x_1(t),\alpha^* C_{16}] \quad \text{Equation 3}$$

wherein $C_{16}$ represents the flow capacity of the link from zone 101 to exit 106, and is selected based on physical characteristics of the passage from zone 101 to exit 106, and the parameter α is a tuning parameter that is specific to a particular design.

In an embodiment based on this example, the function relating the flow of occupants from zone 102 to zone 101 is modeled as:

$$y_{21}(t) = \min\left[a_{21}x_2(t) * \frac{\beta}{C_2} * (C_1 - x_1(t))/C_1, C_{21}\right] \quad \text{Equation 4}$$

where $a_{21}$ is the percent of occupants in zone 102 who have the exit in zone 101 as the nearest exit, the term $\beta/C_2$ represents the delay for occupants moving across zone 102, $C_2$ is the maximum occupancy of zone 102 (i.e., $C_2$ is proportional to the area corresponding to zone 102), the term $(C_1-x_1(t))/C_1$ represents congestion in zone 101 that slows occupants from moving into the zone, $C_{21}$ is the link capacity from zone 102 to 101, and finally β is a tuning parameter. The flow between zone 103 and zone 101 would be modeled in the same manner used to model flow between zone 102 and zone 101. In this way, the occupant traffic model $f$ makes predictions regarding the occupancy in a particular zone based on current information regarding occupancy in each of the zones. In other embodiments, additional modeling parameters may be employed to model additional aspects of movement through the region.

The second component of the equation used to calculate a model-based occupancy estimate (i.e., equation 1) is the process noise represented by the term v(t). The process noise term v(t) accounts for the uncertainty in how occupants move between zones. A straightforward and simplistic approach for modeling the process noise v(t) is to assume that the process noise v(t) in Equation 1 is zero-mean and Gaussian with variance proportional to state x(t) and independent among zones. In an embodiment employing the Extended Kalman Filter, the covariance matrix for the process noise is set equal to a diagonal matrix with elements corresponding to the state variance of the current estimate.

In an exemplary embodiment the occupancy estimation algorithm (e.g., an Extended Kalman Filter) also makes use of a sensor model h, described by the following equation:

$$z(t)=h(t,x(t))+w(t) \quad \text{Equation 5}$$

wherein output vector z(t) represents an occupancy measurement in each of the five zones at time t, function h is the sensor model and is a function of time t and occupant estimate x(t), and w(t) is sensor noise. For example, in the embodiment shown in FIGS. 4A and 4B, a sensor device is located on each border between adjacent zones, and at each exit. In an exemplary embodiment, the resulting sensor model (relevant to zone 101) for the example shown in FIGS. 4A and 4B is expressed as:

$$z_1(t)=z_1(t-1)+\phi_{21}(t)+\phi_{31}(t)-\phi_{16}(t) \quad \text{Equation 6}$$

wherein $z_1(t-1)$ represents the previous measurement (based on sensor input) of occupants in zone 101, $\phi_{21}(t)$ represents sensor outputs indicating occupant movement from zone 102 to zone 101, $\phi_{31}(t)$ represents sensor outputs indicating occupant movement from zone 103 to zone 101, and $\phi_{16}(t)$ represents sensor outputs indicating occupant movement from zone 101 to exit 106. The sensor readings provided by individual sensor devices can be in error, and $z_1(t)$ defined in Equation 6 may therefore accumulate errors over time based on errors in individual sensor readings. However, in an embodiment in which the extended Kalman filter is employed, the sensor noise w(t) is modeled as zero mean and white, with variance equal to the variance of the estimate of the sensor-only estimator (i.e., if the occupant estimate was based only on sensor input and not on the occupant traffic model). In an exemplary embodiment, the sensor data z(t) is analyzed by applying sensor model h to outputs provided by individual sensor devices (e.g., $\phi_{21}(t)$). In another exemplary embodiment, pre-processing is performed on the sensor data z(t) such that the sensor data provided to occupancy estimation algorithm 120 reflects occupancy estimates of zones based on received sensor data (as described in more detail with respect to FIG. 6).

Figure 6:
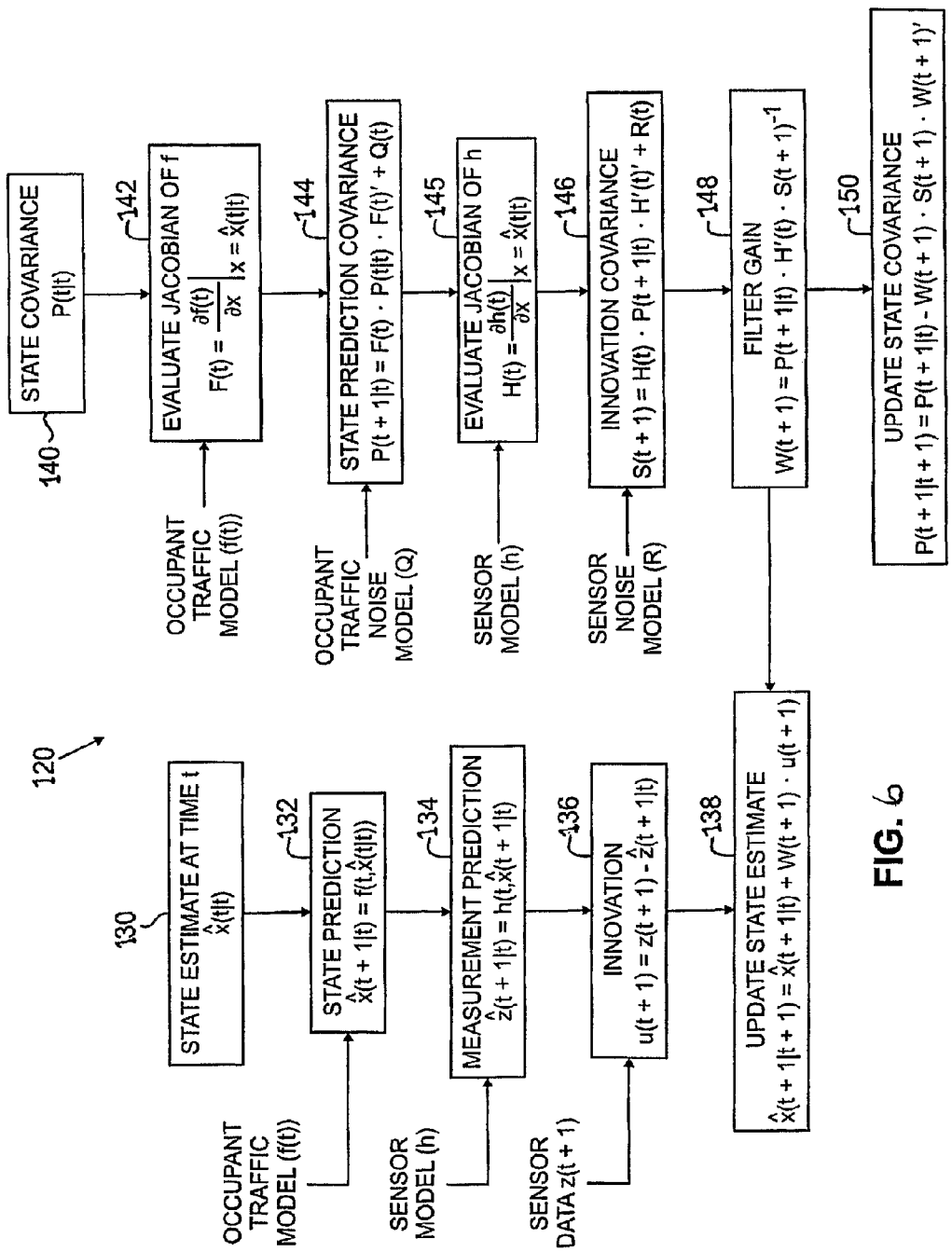
FIG. 6 is a flowchart illustrating an extended Kalman filter algorithm employed to calculate occupancy estimates.

FIG. 6 is a flowchart illustrating an exemplary embodiment of occupancy estimation algorithm 120 as implemented with an Extended Kalman Filter that combines sensor data z(t), sensor model h, and occupant traffic model $f(t)$ to generate occupancy estimates $\hat{x}(t|t)$. The left side of FIG. 6 illustrates the algorithm steps employed to update the state estimate of occupancy, while the right side of FIG. 6 illustrates the algorithm employed to generate a covariance estimate. The covariance estimate P(t|t) is a measure of the uncertainty associated with the occupancy estimate $\hat{x}(t|t)$. In the exemplary embodiment shown in FIG. 6, neither the sensor data z(t) nor the occupancy estimate $\hat{x}(t|t)$ are represented as vectors, although in an exemplary embodiment one or both may be vector quantities.

In this embodiment, calculating or updating of the occupancy estimate $\hat{x}(t+1|t+1)$ begins with a current occupancy estimate (generated in a previous iteration by the Extended Kalman Filter algorithm or by some initialization procedure) $\hat{x}(t|t)$, as shown at step 130. The notation of the occupancy estimate $\hat{x}(t|t)$ denotes that this is the occupancy estimate for time t, based on observations from time t (i.e., combination of both model outputs and sensor updates). At step 132, occupant traffic model $f(t)$ is applied to the current occupancy estimate $\hat{x}(t|t)$ to generate occupancy prediction or model-based occupancy estimate $\hat{x}(t+1|t)$. That is, the occupancy in the next state is predicted based on the current state estimate and the occupant traffic model $f(t)$. The notation $\hat{x}(t+1|t)$ denotes that this is the state prediction for time t+1 based on observations made at time t (i.e., the update is not based on the most recently observed events). At step 134, sensor model h is applied to model-based occupancy estimate $\hat{x}(t+1|t)$ to generate measurement prediction $\hat{z}(t+1|t)$. Measurement prediction 1 (t+1|t) represents the expected sensor measurements based on the model-based occupancy prediction $\hat{x}(t+1|t)$. For instance, if model-based occupancy prediction $\hat{x}_1(t+1|1)$ predicts that one occupant enters zone 101 from zone 102 then measurement prediction $z_{21}(t+1|t)$ will indicate a predicted sensor measurement or observation of one occupant detected entering zone 101 from zone 102.

At step 136, measurement prediction $\hat{z}(t+1|t)$ is compared with actual sensor data z(t+1) to generate a difference signal represented by the innovation variable u(t+1). In this embodiment, sensor data z(t+1) has been pre-processed to provide values representing detected occupants moving between zones. In other embodiments, sensor model h or some other function would need to be applied to incoming sensor data in order to interpret the data such that z(t+1) represents detected occupant movement between zones. Based on the comparison between sensor data z(t+1) and measurement prediction $\hat{z}(t+1|t)$, innovation u(t+1) is determined. In an exemplary embodiment, innovation u(t+1) indicates the difference between expected sensor outputs (calculated at step 134) and the actual observed sensor outputs. For instance, using the example described above, model-based occupancy estimate $x_1(t+1|t)$ predicts one occupant enters zone 101 from zone 102, resulting in a corresponding measurement prediction of $z_{21}(t+1|t)$ being equal to one. If sensor data $z_{21}(t+1)$ instead equals zero, then innovation $u_{21}(t+1|t)$ will indicate the difference or error between the predicted value and the actual sensor value, in this case, an error of one.

At step 138, the occupancy estimate $\hat{x}(t|t)$ is updated based on occupancy prediction $\hat{x}(t+1|t)$, innovation u(t+1) and a weighting coefficient W(t+1) discussed in more detail with respect to the covariance calculations. As indicated by this equation, the updated occupancy estimate $\hat{x}(t+1|t+1)$ is based on both the model-based occupancy estimate $\hat{x}(t+1|t)$ generated based on the occupant traffic model $f(t)$ and the observed sensor data z(t+1). The updated state estimate $\hat{x}(t+1|t+1)$ becomes the current state estimate $\hat{x}(t|t)$ in the next iteration. A benefit of generating the state estimate as a result of both the occupant traffic model $f(t)$ and sensor data z(t+1), is the ability to generate a state estimate indicating occupancy despite a loss of sensor data. In this scenario, the error between the predicted measurement $\hat{z}(t+1|t)$ and sensor data z(t+1) will increase, but an estimate of occupancy $\hat{x}(t+1|t+1)$ may still be generated based on partial sensor data z(t+1) and the occupant traffic model $f(t)$, or based entirely on the occupant traffic model $f(t)$ if no sensor data is available.

In the embodiment shown in FIG. 6, the covariance estimate P(t|t) is generated as an output along with the state estimate $\hat{x}(t|t)$. Whereas the state estimate $\hat{x}(t|t)$ indicates the best guess or estimate of occupancy, the covariance indicates the level of confidence associated with the occupancy estimate. As discussed above, the term occupancy estimate refers broadly not only to estimates regarding the actual number of occupants in a region, but also to data such as the covariance estimates P(t|t) that are calculated in conjunction with actual number of occupant estimates (e.g., $\hat{x}(t|t)$). Calculating or updating of the covariance estimate P(t+1|t+1) begins with a current estimate of the covariance P(t|t), as shown at step 140. At step 142, the occupant traffic model $f(t)$ is evaluated based on previous occupancy estimates to generate a Jacobian matrix depicted as F(t). At step 144, the Jacobian matrix F(t), initial covariance estimate P(t|t), and uncertainty value Q(t) associated with the occupant traffic model are used to generate a predicted covariance P(t+1|t). At step 145, the sensor model h(t) is evaluated based on previous estimates to generate a Jacobian matrix depicted as H(t). At step 146, the Jacobian evaluation H(t) and uncertainty R(t) associated with the sensor model are applied to the predicted covariance P(t+1|t) to generate the innovation covariance S(t+1). At step 148, the inverse of the innovation covariance $S(t+1)^{-1}$ is used to generate weighting parameter W(t+1), which represents the weighting that is applied to the sensor data at step 138.

The weighting parameter W(t+1), as shown by the covariance calculation, weights the confidence level to be applied to the sensor data based on both the sensor models and the occupant traffic models, such that the updated state estimate $\hat{x}(t+1|t+1)$ reflects the determination of which input is most reliable. That is, if the confidence level associated with the sensor data z(t) is high (or confidence in the model-based occupancy estimate $\hat{x}(t+1|t)$ is low), then filter gain value W(t+1) as applied to the innovation u(t+1) at step 138 results in the occupancy estimate providing more weight to the sensor data z(t) than the result of the occupancy prediction $\hat{x}(t+1|1)$ generated by occupant traffic model $f(t)$. Likewise, if the filter gain value W(t+1) indicates a low confidence associated with the sensor data z(t+1) (or confidence in the model-based occupancy estimate is high), then the updated state estimate will be more heavily influenced by the result of the model-based occupancy estimate $\hat{x}(t+1|t)$ and less by the associated sensor data z(t). For instance, in a situation in which sensors are compromised by smoke or fire, then the associated confidence of their outputs is decreased such that occupancy estimates are more heavily influenced by the result of applying occupant traffic model $f(t)$ to the state estimate $\hat{x}(t|t)$.

The weighting of sensor data $z(t)$ may also account for the reliability associated with the type of sensor devices used to provide sensor data $z(t)$. Some sensors are inherently more reliable than others, while others may be reliable in some instances and unreliable in others. The sensor model h, similar to the way in which occupant traffic model $f$ accounts for the layout of a building, can be used to account for variations in types of sensor devices. For instance, a motion detection sensor device may be used to detect whether a room is occupied or not, but does not provide information regarding the number of occupants in a room (i.e., binary output). In this situation, data from the motion detection sensor indicating a room is not occupied (i.e., sensor data for a particular room $z_{room}(t+1)=0$) may be considered highly reliable. However, data from the motion detection sensor indicating a room is occupied (i.e., sensor data for a particular room $z_{room}(t+1)=1$) may be considered less reliable because the data does not account for the possibility that additional occupants may be present in the room. In one embodiment, the sensor model h accounts for the sensor type, and assigns an expected number of occupants located in the room based on size of the room (or some other variable). In addition, the reliability associated with data provided by a particular sensor device may be selectively modified based on the type of sensor device as well as the input received from the sensor device.

At step 150, the state covariance $P(t|t)$ is updated based on the filter gain value $W(t+1)$, the innovation covariance $S(t+1)$, and the predicted covariance $P(t+1|t)$ to generate an updated covariance value $P(t+1|t+1)$. This value reflects the confidence level in the occupancy estimate value $\hat{x}(t+1|t+1)$.

In the embodiment shown in FIG. 6, the occupancy estimation algorithm 120 combines sensor data $z(t)$ and model-based occupancy estimates $\hat{x}(t+1|t)$ generated based on a previous occupancy estimate and a occupant traffic model $f(t)$. In particular, this method applies Extended Kalman Filter techniques to both the sensor data $z(t)$ and the occupant traffic model $f(t)$ to generate an occupancy estimation $\hat{x}(t+1|t+1)$ that takes into account the reliability of these inputs. The result is occupancy estimates $X(t+1|t+1)$ that are highly reliable and covariance estimates $P(t+1|t+1)$ that provide an indication of associated reliability of provided occupancy estimates.

APPENDIX B

Disclosed herein is a system and method for estimating the propagation of threats (e.g., smoke, fire, chemical agents, etc.) through a region based on data provided by sensor devices and threat propagation models. A threat propagation model is a real-time tool that models how threats (such as smoke or chemical agents) will propagate through the region.

The sensor data and the threat propagation model are provided as inputs to a threat propagation algorithm. The threat propagation algorithm combines the sensor data provided by the sensors with the threat propagation model to provide a threat propagation estimate that describes the propagation of the threat through a region.

The term 'threat propagation estimate' is used generally to describe data that describes the propagation or movement of threats through a region. The threat propagation estimate may include, for example, estimates regarding the distribution of particles throughout the region including distribution estimates for individual sub-regions, probabilities associated with the estimates of particle distribution, reliability data indicative of the confidence associated with a threat propagation estimate as well as estimates regarding the likely source of the threat and likely future propagation of the threat. In addition, the term 'region' is used throughout the description and refers broadly to an entire region as well as individual sub-regions or cells making up the larger region. Thus, threat propagation estimates made for a region may include threat propagation estimates for each individual sub-region of the region (e.g., particle distributions for each individual sub-region).

Figure 7:
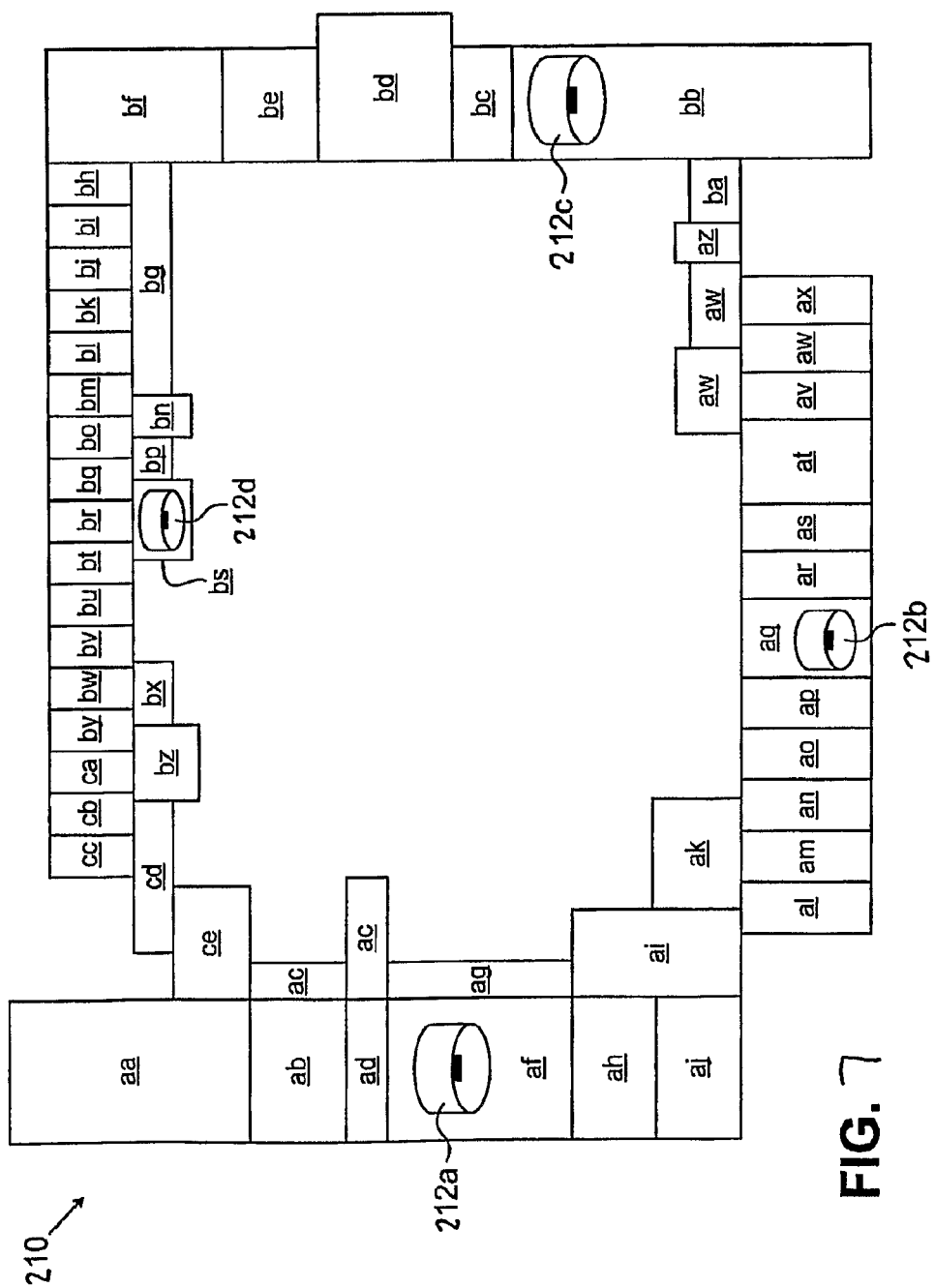
FIG. 7 is a schematic of a floor of a building divided into a number of sub-regions.

FIG. 7 illustrates an example that will be used throughout this description to aid in describing the threat propagation algorithm, in which threat propagation estimates are made for a particular floor of a building. The concepts described with respect to this embodiment can be applied in a variety of settings or locations (e.g., outdoors, train stations, airports, etc.).

FIG. 7 illustrates the layout of a single floor of building 210 divided into a number of individual cells or sub-regions labeled 'aa'-'ce'. Threat detection sensors 212a, 212b, 212c, and 212d are located in various sub-regions of building 210, with threat detection sensor 212a located in sub-region 'af', threat detection sensor 212b located in sub-region 'aq', threat detection sensor 212c located in sub-region 'bb', and threat detection sensor 212d located in sub-region 'bs'. In this embodiment, the floorplan associated with building 210 is divided based on the location of individual rooms and hallways, although regions may be divided in a variety of ways depending on the application (i.e., regions may be divided into smaller or larger sub-regions or different criteria may be used to divide a region into sub-regions). Threat detection sensors 212a-212d may provide binary data indicating the presence of a detected threat, or may provide more detailed information including, for instance, the type of threat detected or the concentration levels associated with a detected threat.

Figure 8:
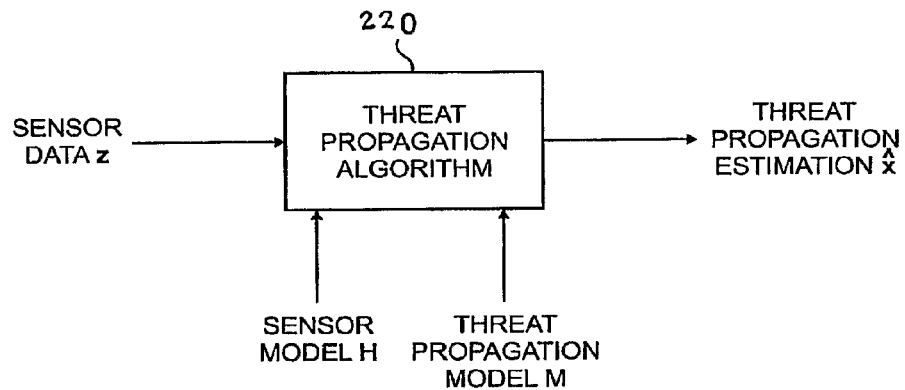
FIG. 8 is a flowchart illustrating an exemplary embodiment of the calculation of threat propagation estimates based on sensor data and a predictive threat propagation model.

FIG. 8 is a high-level block diagram illustrating an exemplary embodiment of the inputs provided to threat propagation algorithm 220 as well as outputs generated by threat propagation algorithm 220. Inputs provided to threat propagation algorithm 220 include sensor data z (provided by one or more sensor devices), sensor model H, and threat propagation model M. Sensor data z may be provided by one or more sensor devices (for example, by sensor devices 212a-212d as shown in FIG. 7). Sensor data z is represented as a vector in this embodiment, wherein the vector represents threat detection data provided by each of the threat detector sensors. In an exemplary embodiment, the threat detection sensors measure and provide as part of sensor data z the concentration level of a detected threat (e.g., concentration of smoke particles). Concentration data may in turn by used calculate the number of particles located in a particular sub-region at which the threat detection sensor is located.

Figure 9:
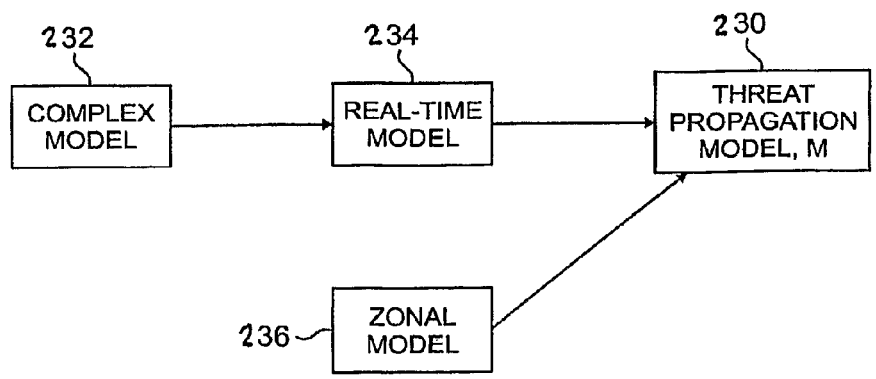
FIG. 9 is a flowchart illustrating an exemplary embodiment of the generation of the predictive threat propagation model.

Threat propagation model M provides a model that predicts how threats will propagate through a region (described in more detail with respect to FIG. 9). Thus, given an initial set of conditions (i.e., detection of a threat in one or more sub-regions), propagation model M is able to make real-time estimates regarding how the threat will propagate through each sub-region. For example, based on the embodiment shown in FIG. 7, if a concentration of smoke particles are detected by threat detection sensor 212a, threat propagation model M generates estimates regarding how the smoke in sub-region 'af' (i.e., the location of threat detection sensor 212a) will propagate to surrounding sub-regions. Threat propagation model M may take into account a number of factors such as interconnection between adjacent sub-regions, the operation of ventilation systems as well as factors such as pressurization of stairwells in buildings.

For instance, in an exemplary embodiment, threat propagation model M is generated based on a computational fluid dynamic (CFD) simulation that models a particular region taking into account factors describing the layout of a region. Based on the computational fluid dynamic simulation, the movement of threats (e.g., smoke particles) can be mapped at different intervals of time. The CFD simulation is a complex and time-consuming process however (e.g., a single simulation may take several hours or even several days to complete) and therefore cannot be used to provide real-time estimates of threat propagation. However, based on the simulation and tracking of particle movements, a model can be generated to reflect the expected movement of particles from one sub-region to adjacent sub-regions. For instance, in an exemplary embodiment a Markov matrix is generated in response to the CFD simulation to describe the movement of particles from one sub-region to an adjacent sub-region as shown by the following equation:

$$M_{ij} = \frac{N_{i \to j}}{\sum_{j=1} N_{i \to j}}$$ Equation 7

As described by Equation 7, $M_{ij}$ is a matrix representing particle movement from each sub-region to adjacent sub-regions, $N_{i \to j}$ represents the number of particles that move from sub-region i to adjacent sub-region j during a specified time-interval, and $\Sigma N_{i \to j}$ represents a sum of movement between sub-region i and all neighboring sub-regions. For instance, with respect to the example shown in FIG. 7, $N_{i \to j}$ may represent the particles that move from sub-region 'af' to adjacent sub-region 'ag', and $\Sigma N_{i \to j}$ would represent the sum of particle movement from sub-region 'ag' to adjacent sub-regions 'ad', 'ae', 'ag', 'ai' and 'ah'. In this way, the denominator in Equation 7 ensures that the sum of each row in Markov matrix $M_{ij}$ (i.e., the probability associated with particles moving from one sub-region to an adjacent sub-region) is unity. The result is a Markov matrix $M_{ij}$ that provides probabilities associated with particles from one sub-region propagating to another sub-region in a selected time interval. Markov matrix $M_{ij}$ can therefore be used to estimate the propagation of the threats through each sub-region based on an initial detection of a threat.

Based on the Markov matrix $M_{ij}$, the propagation of threats (e.g., particles) through various sub-regions can be predicted at future time intervals using the following equation.

$$x^{n+1} = M_{ij} x^n + w^n$$ Equation 8

In this equation, $x^n$ represents the threat distribution at time n (e.g., the distribution of smoke particles in each sub-region at time n), $x^{n+1}$ represents the threat distribution at time n+1, $M_{ij}$ is the Markov matrix described above, and $w^n$ represents process noise. This equation represents an exemplary embodiment of how threat propagation at future instances of time can be estimated based, in part, on a threat propagation model such as the Markov matrix $M_{ij}$ and a previous estimate of threat propagation $x^n$. In this way, the propagation of a threat can be estimated in real-time or near real-time.

Figure 10:
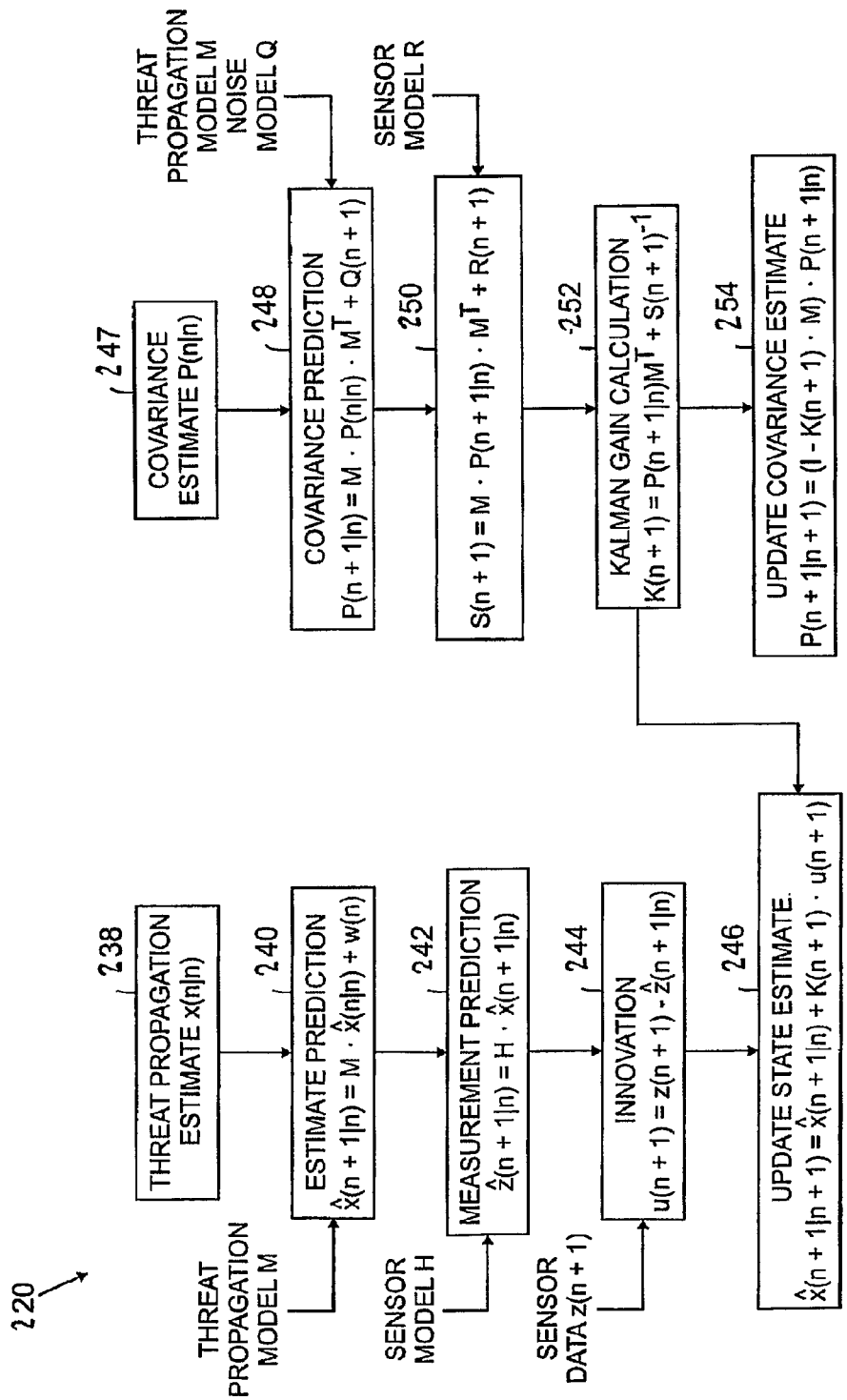
FIG. 10 is a flowchart illustrating an exemplary embodiment of an algorithm employed to generate threat propagation estimates.

As described in more detail with respect to FIG. 10, the threat propagation model (e.g., Markov model) M is provided as an input to the threat propagation algorithm 220. The threat propagation algorithm also receives as input sensor data z provided by one or more sensor devices. Based on the received sensor data z and the threat propagation model M, threat propagation algorithm 220 generates a threat propagation estimate $\hat{x}$. In an exemplary embodiment, threat propagation estimate $\hat{x}$ is a vector that represents the estimated distribution of a threat throughout all sub-regions (including those sub-regions that do not include a threat detection device). For instance, in an exemplary embodiment threat propagation estimate $\hat{x}$ would represent a distribution of smoke particles throughout each sub-region (e.g., cells 'aa', 'ab', 'ac', etc. as shown in FIG. 7) at a particular time n. It should be noted that threat propagation estimate $\hat{x}$ is based on both sensor data z and threat propagation model M. However, if sensor data z is not available or if there have been no changes to sensor data z, then threat propagation estimate $\hat{x}$ may be based only on the propagation estimates generated by the threat propagation model M. In this way, even without the benefit of sensor data z (for instance, if sensors are lost or destroyed by the threat), threat propagation algorithm 220 is able to generate threat propagation estimates $\hat{x}$ into the near future, as well as into the past to estimate the likely source of the threat.

FIG. 9 is a flow chart illustrating an exemplary embodiment regarding the generation of threat propagation model M (represented by the box labeled '230') based on more computational complex simulations or models. In this way, threat propagation model 230 is capable of providing accurate and reliable estimates of threat propagation in real-time. In contrast, the computationally complex simulations on which threat propagation model 230 is based may take many hours or days to complete a simulation regarding how a threat will propagation through a region.

In the exemplary embodiment shown in FIG. 9, threat propagation model 230 is generated based on complex model 232, real-time model 234, and zonal model 236. In an exemplary embodiment, complex model 232 is a computational fluid dynamic model (CFD) that simulates how particles move through a region. Complex model 232 is defined by the physical layout of the region for which the simulation is run, as well as attributes of the region such as pressure differences between sub-regions, or ventilation flows within the region. In this way, complex model 232 accurately simulates the propagation of particles (i.e., threats) through the region at different intervals at time. Based on the result of the simulations run by complex model 232, and the resulting particle distributions generated at different intervals of time, real-time model 234 can be generated to define the expected probability of particles moving from one region to another region. For example, in an exemplary embodiment real-time model 234 is a Markov matrix that defines the probability of particles moving from one sub-region to adjacent sub-regions. Depending on the application, the generation of real-time model 234 (e.g., a Markov matrix) may be sufficient for a particular application and may be used as threat propagation model 230 without further enhancements. As described above, a Markov matrix provides real-time estimates regarding the expected propagation of particles from sub-regions to adjacent sub-regions. In another exemplary embodiment, real-time model 234 is a probability of detection (POD) model that generates real-time estimates regarding the expected propagation of particles from sub-regions to adjacent sub-regions. In this embodiment, the Markov matrix and the POD model are alternatives to one another, although in another embodiment they may be used in conjunction with one another to provide a real-time estimate of the expected propagation of particles from sub-region to sub-region.

In addition, in an exemplary embodiment zonal model 236 may be used in combination with real-time model 234 to generate threat propagation model 230. In particular, zonal model 236 is employed to provide estimates of threat propagations in smaller regions such as corridors connecting rooms in a building. In this embodiment, real-time model 234 provides estimates of threat propagation in larger areas (e.g., large room or atrium) and zonal model 236 provides estimates of threat propagation in smaller areas (e.g., small rooms or hallways). For instance, zonal model 236 may model smaller spaces as one-dimensional areas with probabilities associated with the propagation of the threat between adjacent regions. Zonal model 236 is provided in addition to real-time model 234 to generate threat propagation model 230, which may then be used to generate estimates of how threats will propagate through all sub-regions (large and small) of a region.

In other embodiments, complex model 232 may be used to generate a real-time model 234 that models threat propagations in sub-regions both large and small, obviating the need for zonal model 236. As described in more detail with respect to FIG. 10, the threat propagation model 230 is used in conjunction with sensor data to generate threat propagation estimates for a region or sub-regions.

FIG. 10 is a flowchart illustrating an exemplary embodiment of the threat propagation algorithm 220 for generating threat propagation estimates $\hat{x}(n)$ based on inputs that include sensor data $z(n)$, sensor model H, and threat propagation model M. In the embodiment shown in FIG. 10, threat propagation algorithm 220 is implemented with an Extended Kalman Filter (EKF). The left side of FIG. 10 illustrates the algorithm steps employed to update the threat propagation estimate $\hat{x}(n)$ (i.e., estimates of threat or particle distributions located through the region), while the right side of FIG. 10 illustrates the algorithm employed to generate a covariance estimate $P(n)$. The covariance estimate $P(n)$ is a measure of the uncertainty associated with the threat propagation estimate $\hat{x}(n)$.

In this embodiment, calculating or updating of the threat propagation estimate begins with an initial state or current threat propagation estimate. For example, threat propagation estimation will not begin until a threat is detected. Therefore, in an exemplary embodiment, the location of the sensor first detecting a threat is used to initialize the threat propagation algorithm (i.e., is provided as the previous estimate $\hat{x}(n|n)$). In another embodiment, there is no need to initialize the Extended Kalman Filter because in the first iteration of the Extended Kalman Filter the sensor data $z(n+1)$ provided by a threat detection sensor first detecting a threat will result in an updated threat propagation estimate $\hat{x}(n+1|n+1)$ that will act to initialize the system in the next iteration of the EKF algorithm. The notation of the threat propagation estimates $\hat{x}(n|n)$ denotes that this is threat propagation estimate at a time n, based on observations from time n (i.e., combination of both model outputs and sensor updates). In contrast, the notation $\hat{x}(n+1|n)$ indicates that the propagation estimate is for a time n+1, but is based on sensor data provided at time n. In the exemplary embodiment shown in FIG. 10, threat propagation estimates are updated with new sensor data at each time-step. However, in other embodiments threat propagation estimates may be generated many time steps into the future in order to predict the likely path of the threat.

At step 240, threat propagation model M is applied to a previous threat propagation estimate $\hat{x}(n|n)$, along with process noise $w(n)$ to generate threat propagation prediction $\hat{x}(n+1|n)$ (i.e., a model-based estimate of threat propagation). That is, the expected movement of a threat at a future time step is predicted based on the current threat propagation estimate $\hat{x}(n|n)$ and the threat propagation model M. For example, as described with respect to FIG. 8, the threat propagation model M may be constructed as a Markov Matrix based on computational fluid dynamic simulations. The notation $\hat{x}(n+1|n)$ denotes that this is a model-based prediction for time n+1 based on observations made at time n (i.e., the update is not based on the most recently observed events). At step 242, sensor model H is applied to occupancy prediction $\hat{x}(n+1|n)$ to generate measurement prediction $\hat{z}(n+1|n)$. Measurement prediction $\hat{z}(n+1|n)$ represents the expected sensor measurements based on the threat propagation prediction $\hat{x}(n+1|n)$. For instance, in the exemplary embodiment described with respect to FIG. 7, if threat propagation prediction $\hat{x}_{aq}(n+1|n)$ predicts a threat propagating into sub-region 'aq', then measurement prediction $\hat{z}_{aq}(n+1|n)$ will indicate that threat detection sensor 212b should detect the presence of a threat.

At step 244, measurement prediction $\hat{z}(n+1|n)$ is compared with actual sensor data $z(n+1)$ to generate a difference signal represented by the innovation variable $u(n+1)$. In an exemplary embodiment, innovation $u(n+1)$ indicates the difference between expected sensor $\hat{z}(n+1|n)$ (calculated at step 242) and the actual observed sensor outputs $z(n+1)$. For example, based on the example described above, if threat propagation prediction $\hat{x}_{aq}(n+1|n)$ estimates that the threat has propagated to sub-region 'aq', but threat detection sensor 212b returns a value indicating that no threat has been detected, then innovation variable $u_{aq}(n+1)$ will indicate that a difference exists between the expected propagation of the threat and the propagation of the threat as reported by the sensors. The innovation variable is used to correct differences between model-based threat propagation prediction $\hat{x}(n+1|n)$ and sensor data $z(n+1)$.

At step 246, the threat propagation estimate $\hat{x}(n|n)$ is updated based on threat propagation prediction $\hat{x}(n+1|n)$, innovation $u(n+1)$ and a gain coefficient $K(n+1)$ discussed in more detail with respect to the covariance calculations. As indicated by this equation, the updated threat propagation estimate $\hat{x}(n+1|n+1)$ is based on both the model-based threat propagation prediction $\hat{x}(n+1|n)$ and the observed sensor data $z(n+1)$. The updated threat propagation estimate $\hat{x}(n+1|n+1)$ becomes the current state estimate $\hat{x}(n|n)$ in the next iteration.

The example described with respect to FIG. 10, in which a threat propagation estimate $\hat{x}(n+1|n+1)$ is updated at each time step based on both the threat propagation model M and updated sensor data $z(n+1)$, illustrates one method in which threat propagation estimates may be generated. In other exemplary embodiments, threat propagation estimates $\hat{x}(n+1|n+1)$ may also be generated at multiple time intervals into the future to illustrate the estimated propagation of the threat through a region (e.g., threat propagation estimates may be generated at successive time intervals without waiting for updated sensor data). In this way, the threat propagation estimates $\hat{x}(n+1|n+1)$ may be generated many time steps into the future to provide first responders and others with information regarding how the threat is expected to propagate. As updated sensor data $z(n+1)$ (either data indicative of concentrations levels associated with a threat, or other sensors reporting detection of a threat) become available, the threat propagation estimates $\hat{x}(n+1|n+1)$ are updated. In this way, threat propagation estimates $\hat{x}(n+1|n+1)$ are improved or fine-tuned as new sensor data becomes available.

In an exemplary embodiment shown in FIG. 10, the covariance estimate $P(n+1|n+1)$ is generated as an output along with the threat propagation estimate $\hat{x}(n+1|n+1)$. Whereas the threat propagation estimate $\hat{x}(n+1|n+1)$ indicates the best guess or estimate regarding threat propagation, the covariance $P(n+1|n+1)$ indicates the level of confidence associated with the threat propagation estimate $\hat{x}(n+1|n+1)$. As discussed above, the term threat propagation estimate refers broadly not only to estimates regarding the expected propagation of the threat through the region, but also to reliability data such as the covariance estimate P(n+1|n+1), which is calculated in conjunction with estimates regarding the estimated movement of the threat throughout the region.

Calculating or updating of the covariance estimate begins with a current estimate of the covariance P(n|n). At step 248, a covariance prediction P(n+1|n) (similar to the threat propagation prediction made at step 240) is generated based on the threat propagation model M, a previous covariance estimate P(n|n), a Jacobian evaluation of the threat propagation model $M^T$, and a noise value Q associated with the estimate. At step 250, a residual covariance S(n+1) is calculated based on the threat propagation model M, a covariance prediction P(n+1|n), a Jacobian evaluation of the threat propagation model $M^T$ and a sensor model. Based on the calculations made at steps 248 and 250, the covariance prediction P(n+1|n), the Jacobian evaluation of the threat propagation model $M^T$, and an inverse representation of the residual covariance $S(n+1)^{-1}$ are used to calculate the optimal Kalman gain K(n+1) at step 252.

The gain coefficient K(n+1) represents the confidence associated with the sensor data based on both the sensor model R and the threat propagation model M, such that the updated threat propagation estimate $\hat{x}$(n+1|n+1) reflects the determination of which input is most reliable. That is, if the confidence level associated with the sensor data is high (or confidence in the threat propagation model is low), then gain value K(n+1) as applied to the innovation value u(n+1) at step 246 results in the threat propagation estimate providing more weight to the sensor data z(n+1) than the result of the threat propagation prediction $\hat{x}$(n+1|1) generated by threat propagation model M. Likewise, if the gain value K(n+1) indicates a low confidence associated with the sensor data z(n+1) (or confidence in the model-based threat propagation estimate $\hat{x}$(n+1|n) is high), then the updated threat propagation estimate $\hat{x}$(n+1|n+1) will be more heavily influenced by the result of threat propagation prediction $\hat{x}$(n+1|n) and less by the associated sensor data z(n+1). For instance, in a situation in which sensors are destroyed by smoke or fire, then the associated confidence of their outputs is decreased such that threat propagation estimates are more heavily influenced by the result of applying threat propagation model M to the state estimate $\hat{x}$(n|n).

At step 254, the state covariance P(n|n) is updated based on the gain value K(n+1), threat propagation model M, and the predicted covariance P(n+1|n) to generate an updated covariance value P(n+1|n+1). This value reflects the confidence level in the occupancy estimate value $\hat{x}$(n+1|n+1).

In the embodiment shown in FIG. 10, threat propagation algorithm 238 provides a fusing or combining of sensor data z(n+1) and model-based threat propagation estimates $\hat{x}$(n+1|n) generated based on a threat propagation model M. In particular, this method applies Extended Kalman Filter techniques to both the sensor data z(n+1) and the threat propagation model M to generate a threat propagation estimate $\hat{x}$(n+1|n+1) that takes into account the reliability of these inputs. The result is a threat propagation estimate $\hat{x}$(n+1|n+1) that is highly reliable and a covariance estimate P(n+1|n+1) that provides an indication of reliability associated with the threat propagation. In other embodiments, algorithms other than an Extended Kalman Filter may be employed to generate threat propagation estimates that make use both of sensor data z(n+1) provided by threat detection sensors and threat propagation models M. In other embodiments, data in addition to threat propagation estimates and reliability data (e.g., covariance) may be generated as part of the threat propagation estimate.

In addition, in an exemplary embodiment the threat propagation estimate $\hat{x}$(n+1|n+1) provided by threat propagation algorithm 238 is generated in real-time, allowing the threat propagation estimate $\hat{x}$(n+1|n+1) to be used in real-time applications (e.g., as input to first responders). This is a function both of the type of threat propagation model M employed (e.g., the Markov model described with respect to FIG. 9) as well as the algorithm (e.g., the Extended Kalman Filter described with respect to FIG. 10) used to combine sensor data z(n+1) and threat propagation model M. In an exemplary embodiment, a threat propagation estimate may be used for forensic or after the fact estimates of how a threat propagated through a region. In yet another exemplary embodiment, the threat propagation estimate can be used to predict threat propagation estimates into the near future (i.e., estimating the location of threats at various intervals, from a number of seconds into the future to a number of minutes). By predicting the propagation of threats into the future, first responders or egress support systems are able to plan evacuation routes for occupants. In addition, in exemplary embodiments a threat propagation estimates may be provided to occupant estimation systems to generate occupant estimates (i.e., estimates regarding the likely location of occupants in a region) based on the likely response of occupants to the propagation of the threat.

The invention claimed is:

1. An egress support system comprising:
    an input operably connected to receive a first occupant detection data, a second occupant detection data from an occupant detection device, and threat location data from an threat detection device;
    a threat propagation estimator operably connected to the input, the threat propagation estimator executes a threat propagation algorithm that generates a threat propagation estimate based on the received threat location data and a model-based threat propagation estimate generated by a threat propagation model;
    an egress controller operably connected to the input and including an optimization algorithm and a prediction model, wherein the threat propagation estimate is provided to the egress controller, and wherein the egress controller executes the optimization algorithm to select an optimal egress route based on model-based estimates generated by the prediction model in response to the first occupant detection data and the threat propagation estimate, and an alternate route based on model-based estimates generated by the prediction model in response to the second occupant detection data and the threat propagation estimate; and
    an output operably connected to communicate the optimal egress route and the alternate route selected by the optimization algorithm,
    wherein the output is operably connected to provide control instructions generated by the egress controller based on the selected optimal egress route to occupant-based egress instructional devices that direct first occupants along the selected optimized egress route, and wherein the output is operably connected to provide control instructions generated by the egress controller based on the selected alternate egress route to occupant-based egress instructional devices that direct second occupants along the selected alternate egress route.

2. The egress support system of claim 1, wherein the prediction model is an egress prediction model that generates model-based egress estimates predicting occupant egress based on the occupant location data and a plurality of potential egress routes.

3. The egress support model of claim 2, wherein the optimization algorithm selects the optimal egress route based on the model-based egress estimate that minimizes a time required to evacuate all occupants.

4. The egress support system of claim 1, further including:
an occupancy estimator operably connected to the input,
the occupancy estimator executes an occupancy estimation algorithm that generates an occupancy estimate based on the received occupant location data and a model-based occupancy estimate generated by an occupant traffic model, wherein the occupancy estimate is provided to the egress controller.

5. The egress support system of claim 4, wherein the occupant traffic model is dynamically modified by the egress controller based on the optimal egress route selected by the optimization algorithm.

6. The system of claim 1, wherein the occupant-based egress instructional devices include visual signs, auditory devices, or a combination of both.

7. The system of claim 1, wherein the output is operably connected to provide the optimal egress route, the occupant location data, and the threat location data to a first responder device.

8. The system of claim 1, wherein the output is operably connected to communicate building controller instructions generated by the egress controller in response to the threat detection data and the optimal egress route to a building controller.

9. The system of claim 8, wherein the building controller controls the operation of elevators located within the region based on the building controller instructions provided by the egress controller.

10. The system of claim 8, wherein the building controller controls the operation of heating, venting, and air-conditioning (HVAC) systems located within the region based on the building controller instructions provided by the egress controller.

11. A method of providing egress support to a first region and a second region, the method comprising:
acquiring detection data from one or more occupant detection devices, wherein the detection data is first occupant detection data and second occupant data;
acquiring threat location data and threat detection data from one or more threat detection devices;
generating a model-based estimate based on a predictive model, the first occupant detection data, the second occupant detection data, the threat detection data and the threat location data;
selecting an optimal egress route for first occupants within the first region based on the model-based estimate;
selecting an alternate egress route for second occupants within the second region based on the model-based estimate;
controlling one or more egress instructional devices based on the selected optimal egress route to instruct the movement of occupants within the first region; and
controlling one or more egress instructional devices based on the selected alternate egress route to instruct the movement of occupants within the second region,
wherein generating the model-based estimate further includes generating model-based threat prediction estimates based on a threat prediction model, the threat detection data, and the threat location data,
wherein selecting an optimal egress route includes selecting an egress route that minimizes first occupant exposure to a detected threat based on the model-based threat prediction estimates, and
wherein selecting an alternate egress route includes selecting an egress route different from the first egress route that minimizes second occupant exposure to a detected threat based on the model-based threat prediction estimates.

12. The method of claim 11, wherein generating the model-based estimate includes
generating model-based egress estimates based on an egress prediction model, a plurality of possible egress routes, the first occupant detection data, and the second occupant detection data, and wherein each model-based egress estimate includes an estimated time to evacuate occupants based on one of the plurality of possible egress routes,
wherein selecting an optimal egress route further includes selecting one of the plurality of possible egress routes based on the model-based egress estimate that minimizes the estimated time to evacuate the first occupants.

13. The method of claim 11, wherein controlling one or more egress instructional devices includes controlling auditory devices and visual devices to communicate the selected optimized egress route to first occupants and to communicate the selected alternate egress route to second occupants.

14. A non-transitory computer readable storage medium encoded with a machine-readable computer program code for selecting an optimal egress route for a first region and an alternate egress route for a second region, the computer readable storage medium including instructions for causing a controller to implement a method comprising:
acquiring detection data from one or more occupant detection devices, wherein the detection data is first occupant detection data and second occupant data;
acquiring threat location data and threat detection data from one or more threat detection devices;
generating model-based estimates based on a prediction model, the first occupant detection data, the second occupant detection data, the threat detection data and the threat location data;
selecting an optimal egress route for first occupants within the first region based on the model-based estimates;
selecting an alternate egress route for second occupants within the second region based on the model-based estimate;
controlling one or more egress instructional devices based on the selected optimal egress route to instruct the movement of occupants within the first region; and
controlling one or more egress instructional devices based on the selected alternate egress route to instruct the movement of occupants within the second region,
wherein generating the model-based estimate includes generating model-based threat prediction estimates based on a threat prediction model, the threat detection data, and the threat location data,
wherein selecting an optimal egress route includes selecting an egress route that minimizes first occupant exposure to a detected threat based on the model-based threat prediction estimate, and
wherein selecting an alternate egress route includes selecting an egress route different from the first egress route that minimizes second occupant exposure to a detected threat based on the model-based threat prediction estimate.

* * * * *